(12) United States Patent
Greenbaum

(10) Patent No.: US 8,808,512 B2
(45) Date of Patent: Aug. 19, 2014

(54) ELECTROLYZER APPARATUS AND METHOD OF MAKING IT

(71) Applicant: Hydrogen Production Associates, Inc., Knoxville, TN (US)

(72) Inventor: Elias Greenbaum, Knoxville, TN (US)

(73) Assignee: GTA, Inc., Knoxville, TN (US)

( * ) Notice: Subject to any disclaimer, the term of this patent is extended or adjusted under 35 U.S.C. 154(b) by 0 days.

(21) Appl. No.: 13/747,238

(22) Filed: Jan. 22, 2013

(65) Prior Publication Data
US 2014/0202877 A1 Jul. 24, 2014

(51) Int. Cl.
*C25B 1/10* (2006.01)
*C25B 9/08* (2006.01)

(52) U.S. Cl.
CPC .................................. *C25B 1/10* (2013.01)
USPC ............. 204/263; 123/3; 204/266; 205/628; 205/637

(58) Field of Classification Search
USPC .............. 204/263–266; 205/628–639; 123/3
See application file for complete search history.

(56) References Cited

U.S. PATENT DOCUMENTS

| | | | |
|---|---|---|---|
| 3,379,634 A * | 4/1968 | Rutkowski | 204/258 |
| 3,554,893 A | 1/1971 | De Varda | |
| 3,767,557 A | 10/1973 | Lamm | |
| 3,855,104 A | 12/1974 | Messner | |
| 3,976,550 A | 8/1976 | De Nora et al. | |
| 4,014,776 A | 3/1977 | Giacopelli | |
| 4,061,557 A | 12/1977 | Nishizawa et al. | |
| 4,126,534 A | 11/1978 | Boulton | |
| 4,206,030 A | 6/1980 | Santora | |
| 4,250,002 A | 2/1981 | Lazarz et al. | |
| 4,311,577 A | 1/1982 | Kircher | |
| 4,367,134 A | 1/1983 | Kircher | |
| 4,432,859 A | 2/1984 | Andreassen et al. | |
| 4,457,824 A * | 7/1984 | Dempsey et al. | 204/290.11 |

(Continued)

FOREIGN PATENT DOCUMENTS

| | | |
|---|---|---|
| EP | 1464728 A1 | 10/2004 |
| JP | 2009-131736 A1 | 6/2009 |

OTHER PUBLICATIONS

"Asbestos: Properties, Health Effects, and Hazard Management," http://web.archive.org/web/20111203170231/http://hseworld.net/en/sites/default/files/ASBESTOS.pdf; Dec. 3, 2011.*

(Continued)

*Primary Examiner* — Nicholas A Smith
(74) *Attorney, Agent, or Firm* — McDermott Will & Emery LLP

(57) ABSTRACT

An apparatus for the electrolytic splitting of water into hydrogen and oxygen gases is disclosed. The apparatus comprises: (i) a first hemi-enclosure; (ii) a second hemi-enclosure; (iii) a diaphragm electrode array positioned between the first hemi-enclosure and the second hemi-enclosure comprising: (a) a diaphragm, that passes ions and impedes the passage of gases, comprising a first side and a second opposed side; (b) a first plurality of electrodes in a first vicinity of the first side of the diaphragm; and (c) a second plurality of electrodes in a second vicinity of the second opposed side of the diaphragm; (iv) a fastener, for leak-tight fastening of the first hemi-enclosure, the diaphragm electrode array, and the second hemi-enclosure, whereby a leak-tight enclosure is formed; (v) contacts, for electrically powering the first and second pluralities of electrodes, and; (vi) pathways, configured to remove hydrogen and oxygen gases from the enclosure.

12 Claims, 29 Drawing Sheets

(56) References Cited

U.S. PATENT DOCUMENTS

| | | | |
|---|---|---|---|
| 4,474,612 A | | 10/1984 | Lohrberg |
| 4,541,911 A | | 9/1985 | Burgess et al. |
| 4,615,783 A | | 10/1986 | Staab |
| 4,627,897 A | | 12/1986 | Tetzlaff et al. |
| 4,636,291 A | | 1/1987 | Divisek et al. |
| 4,773,982 A | | 9/1988 | Divisek et al. |
| 5,080,963 A | | 1/1992 | Tatarchuk et al. |
| 5,130,006 A | | 7/1992 | Oligny |
| 5,171,644 A | | 12/1992 | Tsou et al. |
| RE34,233 E | | 4/1993 | Bachot et al. |
| 5,211,828 A | * | 5/1993 | Shkarvand-Moghaddam ... 204/266 |
| 5,599,430 A | | 2/1997 | Pimlott et al. |
| 5,606,488 A | | 2/1997 | Gustafson |
| 5,660,698 A | | 8/1997 | Scannell et al. |
| 5,728,485 A | | 3/1998 | Watanabe et al. |
| 6,582,571 B2 | | 6/2003 | Romine et al. |
| 6,797,136 B2 | | 9/2004 | Shimamune |
| 7,132,190 B2 | | 11/2006 | Blum et al. |
| 7,323,090 B2 | | 1/2008 | Houda et al. |
| 7,611,618 B2 | * | 11/2009 | Davidson ............ 205/341 |
| 7,670,472 B2 | * | 3/2010 | Faita et al. ............ 205/515 |
| 7,704,353 B2 | | 4/2010 | Stadelmann et al. |
| 7,892,694 B2 | | 2/2011 | Nakano et al. |
| 7,901,549 B2 | | 3/2011 | Jupudi et al. |
| 7,906,006 B2 | | 3/2011 | Irvine et al. |
| 7,922,879 B2 | | 4/2011 | Kodama et al. |
| 7,951,274 B2 | | 5/2011 | Yoshida et al. |
| 7,959,773 B2 | | 6/2011 | Hou et al. |
| 7,964,068 B2 | | 6/2011 | Kitaori et al. |
| 8,066,784 B2 | | 11/2011 | Padberg et al. |
| 8,075,749 B2 | | 12/2011 | McAlister |
| 8,075,750 B2 | | 12/2011 | McAlister |
| 8,273,495 B2 | | 9/2012 | Schick et al. |
| 8,277,620 B2 | | 10/2012 | Bourgeois |
| 2002/0037422 A1 | | 3/2002 | Takahashi et al. |
| 2002/0157958 A1 | | 10/2002 | Kikuchi et al. |
| 2003/0057088 A1 | | 3/2003 | Ichikawa et al. |
| 2004/0182695 A1 | | 9/2004 | Bulan et al. |
| 2008/0067078 A1 | | 3/2008 | Kitaori et al. |
| 2008/0257751 A1 | * | 10/2008 | Smola et al. ............ 205/628 |
| 2009/0026089 A1 | | 1/2009 | Kothe et al. |
| 2009/0127130 A1 | * | 5/2009 | Highgate et al. ............ 205/628 |
| 2010/0012503 A1 | * | 1/2010 | Hinatsu et al. ............ 205/628 |
| 2010/0032221 A1 | | 2/2010 | Storey |
| 2010/0280347 A1 | | 11/2010 | Shah et al. |
| 2011/0155583 A1 | * | 6/2011 | Li ............ 205/637 |
| 2011/0243294 A1 | | 10/2011 | Jetter |
| 2012/0149789 A1 | * | 6/2012 | Greenbaum ............ 518/704 |
| 2012/0193242 A1 | | 8/2012 | Marchal |

OTHER PUBLICATIONS

Hering, Carl. 2008. Practical Directions for Winding Magnets for Dynamos. BiblioBazaar, reprinted 2008, 76 pages.

Mattox, Donald M. 2010. The Handbook of Physical Vapor Deposition Processing, Second Edition, May 19, 2010.

Querfurth, William. 1954. Coil Winding: A Description of Coil Winding Procedures, Winding Machines and Associated Equipment. G. Stevens Mfg. Co. Pub. 1954, 128 pages. (Uploaded to patent file in 3 files: Querfurth 1, 2, and 3.).

US Department of Energy. 2012. Joint Fuel Cells Technologies and Advanced Manufacturing Office Webinar, Fuel Cell Technologies Office and Advanced Manufacturing Office, Webinar dated Nov. 20, 201.

Glowacki, B. et al. 1998. Grain Boundaries and Electronic Materials. Materials World, vol. 6, No. 11, pp. 683-686, Nov. 1998. (Downloaded from http://www.azom.com/article.aspx?ArticleID=628).

Kruger, J. 2001. Electrochemistry of Corrosion. In Electrochemistry Encyclopedia (Case Western Reserve University, Cleveland, Ohio), 12 pages, Apr. 2001 (Downloaded from http://electrochem.cwru.edu/encycl/art-c02-corrosion.htm).

NREL/DOE Hydrogen and Fuel Cell Manufacturing R&D Workshop report. 2011. National Renewable Energy Laboratory (NREL) / Department of Energy Office of Energy Efficiency & Renewable Energy, Department of Energy, Aug. 11-12, 2011 (downloaded Apr. 22, 2013 from http://www1.eere.energy.gov/hydrogenandfuelcells/pdfs/mfg2011_wkshp_report.pdf).

Pratt, H. 2012. The NSTA Reader's Guide to a Framework for K-12 Science Education: Practices, Crosscutting Concepts, and Core Ideas. NSTA Press, Arlington, VA, 2012, 36 pages.

Stansbury, E.E. et al. 2000. Fundamentals of Electrochemical Corrosion. ASM International, Materials Park, Ohio. 14 pages.

ISA/European Patent Office. 2014. International Search Report and Written Opinion of the International Searching Authority, dated Feb. 20, 2014, for PCT Application PCT/US2013/068136, filed Nov. 1, 2013, entitled "Hydrolyzer Apparatus and Method for Making It."

US Patent and Trademark Office, Art Unit 1754. 2014. Pre-Interview First Office Action, dated Jun. 4, 2014, for U.S. Appl. No. 14/178,878, filed Feb. 12, 2014, entitled "Hydrolyzer Apparatus and Method for Making It."

\* cited by examiner

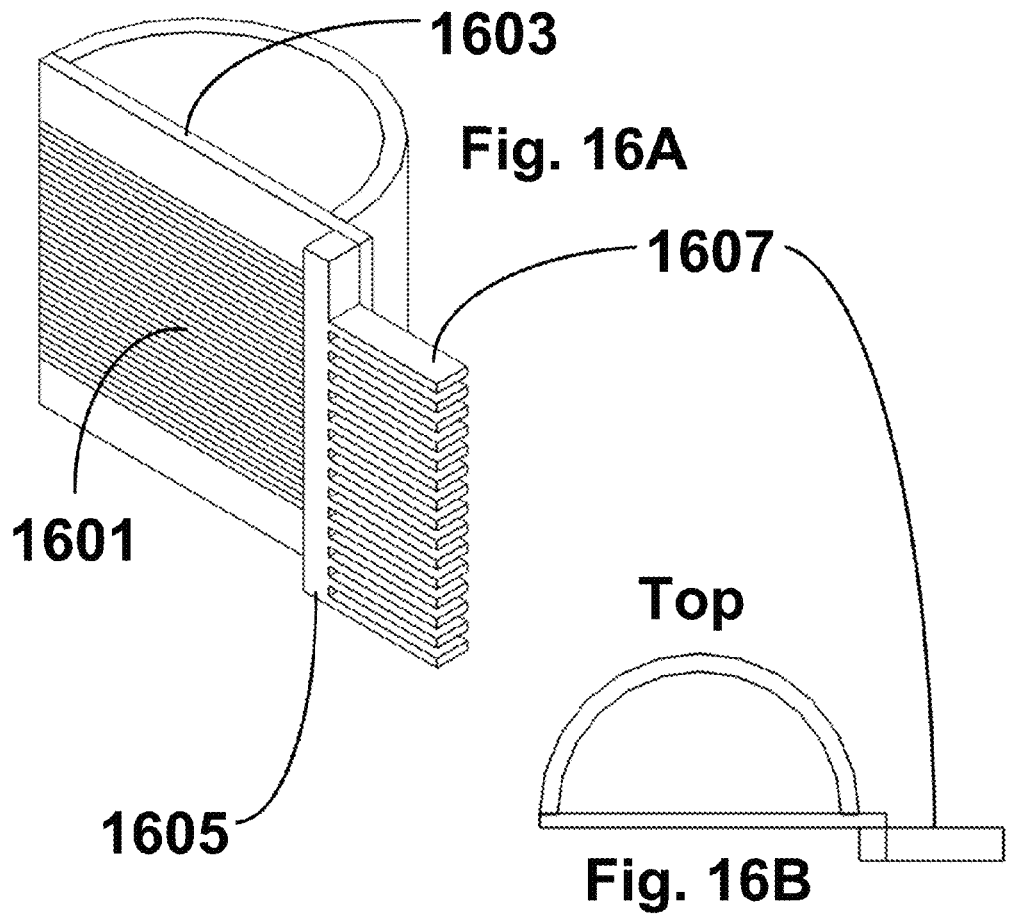
Perspective
Fig. 16A
Top
Fig. 16B
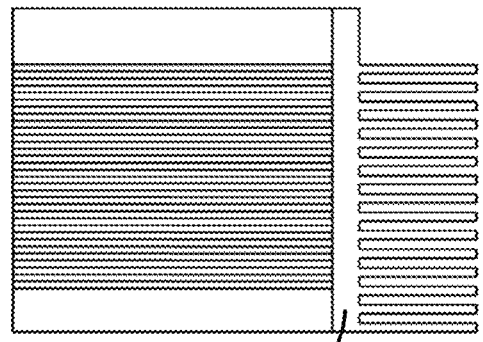
Front
Fig. 16C

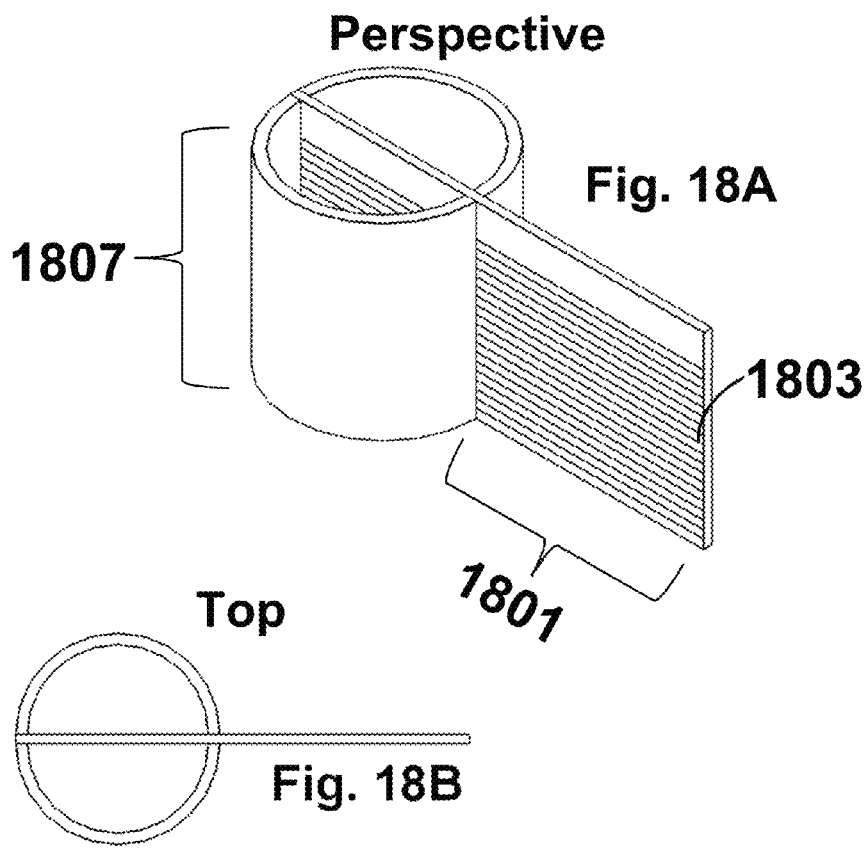
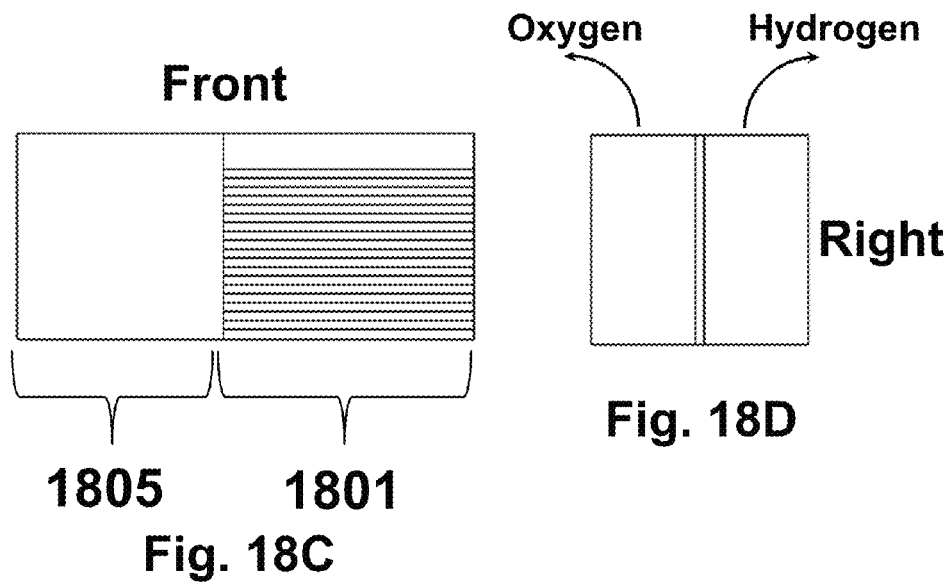

Wire Trimmed from Diaphragm Edges

Perspective
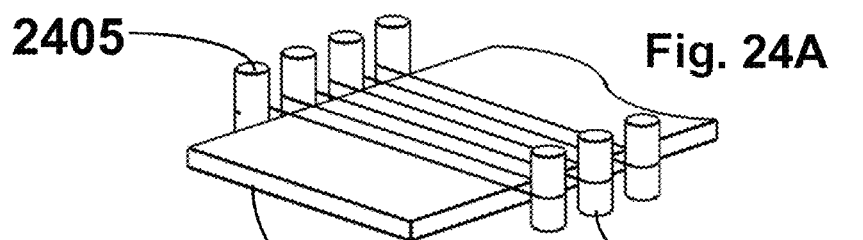
Fig. 24A
Top
Fig. 24B
Front
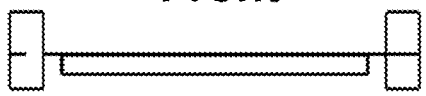
Fig. 24C
Right
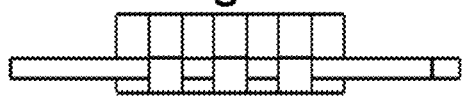
Fig. 24D

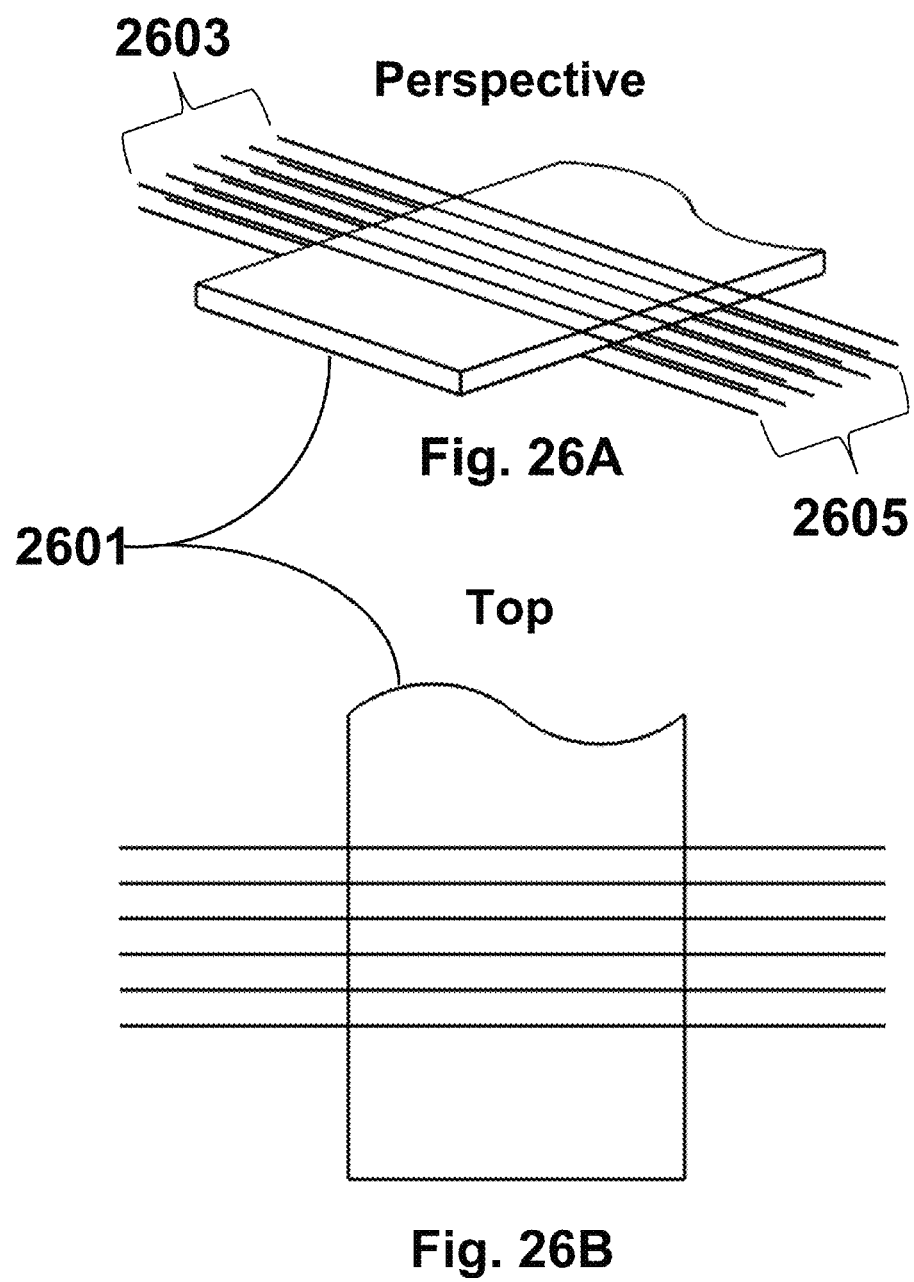

ELECTROLYZER APPARATUS AND METHOD OF MAKING IT

BACKGROUND

1. Field

The disclosure relates to electrolysis and more particularly electrolyzer apparatuses for the electrolytic splitting of water into hydrogen and oxygen gases.

2. Description of Related Art

Hydrogen gas is a commodity chemical that is used in numerous manufacturing processes, such as petroleum refining, fertilizer production, glass manufacturing and many others. Hydrogen gas can also be used for storing intermittent renewable energy, such as wind electrical energy and solar electrical energy. Electrolytic hydrogen and oxygen can be produced using nuclear-energy generated electricity and transported in pipe lines to distances remote from the nuclear reactor.

One commercial process for hydrogen production is steam reforming from hydrocarbons. However, steam reforming may utilize non-renewable sources of energy. Carbon monoxide and carbon dioxide may be by-products of fossil fuel-based methods for hydrogen production. There is considerable interest in finding non-polluting methods for large scale production of hydrogen, such as the electrolysis of water.

Solar photovoltaic and wind electricity generation are areas of technological activity in renewable energy. These technologies may suffer from an intermittency problem: solar and wind energies are not continuously available. Electrolysis of water may solve this problem by storing hydrogen and using it as a backup with fuel cells when solar and wind energies are not available. However, conventional electrolyzers may be complex structures that are labor-intensive to construct, metal-intensive in their use of materials and/or may not adequately lend themselves to modular scale-up for large-scale energy applications. Governments world-wide have spent more than $500 million dollars over the past 20 years in an effort to solve the problem of introducing advanced manufacturing techniques to expand the supply chain of electrolyzers for large-scale energy applications. Yet, the solution of this long-standing and important problem, the utilization of advanced manufacturing techniques for the practical large-scale production of inexpensive electrolyzers, may not have been achieved. Impediments to solving the problem are presented in the 2011 NREL/DOE Hydrogen and Fuel Cell Manufacturing R&D Workshop report, Aug. 11-12, 2011, Office of Energy Efficiency & Renewable Energy, Department of Energy, which is incorporated herein by reference in its entirety. The overall purpose of the workshop was to identify and prioritize: (1) barriers to the manufacture of hydrogen and fuel cell systems and components and (2) high-priority needs and R&D activities that government can support to overcome the barriers. Key results of the workshop report were plans for additional research on overcoming the barriers. The consensus vote of the workshop participants on the strategy for electrodes was how to apply ink directly to membranes. For the foregoing reasons, there remains a need for solving the long-standing problem of large-scale production of inexpensive electrolyzers that integrate advanced manufacturing techniques into the fabrication processes. The presentation materials of the 2012 Joint Fuel Cell Technologies and Advanced Manufacturing Office Webinar are incorporated herein by reference in their entirety. The 2011 report and 2012 Webinar materials are available as PDF files from the DOE Office of Energy Efficiency & Renewable Energy at http://www1.eere.energy.gov/hydrogenandfuelcells/wkshp_h2_fc_manufacturing.html.

Electrolysis of water is a route to the production of hydrogen gas. Moreover, gaseous oxygen may be produced as a byproduct which may be a useful and valuable industrial and medical product. Electricity that is generated by renewable energy sources, such as wind, hydroelectric, solar and nuclear energy, can be used for electrolytic production of hydrogen and oxygen without the carbon dioxide and carbon monoxide that accompanies hydrogen production from fossil fuels. Patent references directed to electrolysis technology include, for example, U.S. Pat. Nos. 8,277,620, 8,273,495, 8,075,750, 8,075,749, 8,066,784, 7,964,068, 7,959,773, 7,951,274, 7,922,879, 7,906,006, 7,901,549, 7,892,694 7,704,353, 7,323,090, 7,132,190, 6,797,136, 6,582,571, 6,282,774, 5,728,485, 5,660,698, 5,606,488, 5,599,430, 5,171,644, 5,130,006, 5,080,963, 4,773,982, 4,636,291, 4,615,783, 4,541,911, 4,474,612, 4,432,859, 4,367,134, 4,311,577, 4,250,002, 4,206,030, 4,061,557, 4,014,776, 3,976,550, 3,855,104, 3,554,893, RE34,233, and U.S. Application Publication Nos. 2012/0193242, 2012/0149789, 2011/0243294 2010/0280347, 2010/0032221, 2009/0026089, 2008/0067078, 2004/0182695, 2003/0057088, 2002/0157958, 2002/0037422.

The electrolysis of water may involve the decomposition of water into oxygen and hydrogen gases by the action of an electric voltage applied to the water across electrodes of opposite polarity. Hydrogen may be produced at the negative electrode (cathode) and oxygen may be produced at the positive electrode (anode), as shown by the following reactions:

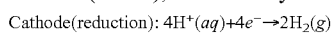

Cathode(reduction): $4H^+(aq) + 4e^- \rightarrow 2H_2(g)$

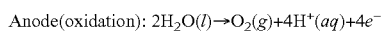

Anode(oxidation): $2H_2O(l) \rightarrow O_2(g) + 4H^+(aq) + 4e^-$

In some electrolytic cells, a diaphragm that passes ions and impedes the passage of gases may separate cathode and anode compartments. The diaphragm may allow ionic conductivity between the compartments, while maintaining separation of the hydrogen and oxygen gases that are formed in their respective compartments. The anode reaction may remove electrons from water molecules under the influence of an applied external voltage. The removal of electrons may liberate oxygen and protons, $H^+$, from the water. The protons may migrate across the diaphragm and combine with the removed electrons to form hydrogen. The combined net cathode and anode reactions may be: $2H_2O \rightarrow 2H_2 + O_2$.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 16A, 16B, and 16C illustrate a perspective view, top view, and front elevation view, respectively, of a busbar electrically contacting a first plurality of electrodes and comprising heat sinks.

FIGS. 18A, 18B, 18C, and 18D illustrate mid-zone perspective, top, front, and right elevation views, respectively, of a high temperature electrolyzer apparatus comprising an extended electrical contact region.

FIGS. 24A, 24B, 24C and 24D illustrate perspective, top, front elevation and right elevation views, respectively, of applying wire to a diaphragm using serpentine wire winding.

FIGS. 26A and 26B illustrate perspective and top views, respectively, of wire that has been applied using a method of independent wire strand placement.

DETAILED DESCRIPTION OF ILLUSTRATIVE EMBODIMENTS

Figures 1A, 1B:
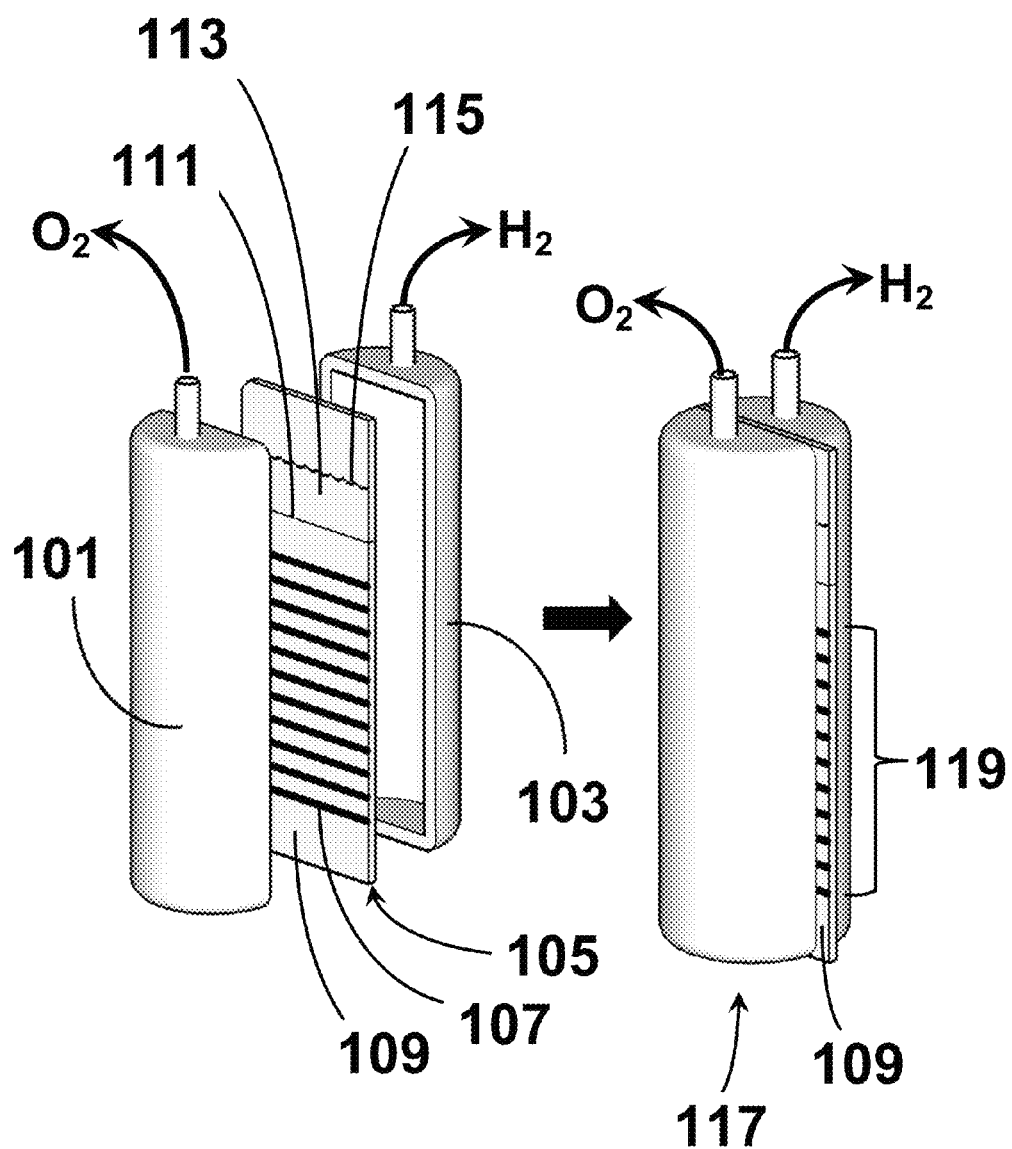
FIGS. 1A and 1B illustrate exploded and assembled views, respectively, of an embodiment of an electrolyzer apparatus comprising continuous zone hemi-enclosures.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described. The disclosed embodiments are not limited by the ordering of acts or procedures. Some acts may occur in different orders and/or simultaneously with other acts or events, such as the acts of rotation and linear movement, for example. Not all illustrated acts or events are required to implement a procedure and/or method described in the disclosure.

As used herein:

"Component" means a part or element of a larger structure.

"Diaphragm" means a barrier that passes ions and impedes the passage of gases. In some embodiments the diaphragm is reticulated. In other embodiments the diaphragm is porous, wherein the diaphragm is substantially free of holes, pores or channels that form line-of-sight pathways between a first side of the diaphragm and a second opposed side of the diaphragm. In other embodiments, the diaphragm is free of colinear holes, pores or channels that sandwich a membrane. Examples of reticulated and/or porous materials that possess the requisite properties for diaphragms are polyethylene, polypropylene, polyimide, polyamidimide, polyvinylidene fluoride, and polytetrafluoroethylene. In some embodiments, the diaphragm may include Nafion®, proton exchange membranes, and/or polymer electrolyte membranes.

"Diaphragm electrode array" means a diaphragm comprising an electrode array.

"Electrode array" means a group of related electrodes.

"Enclosure" means a structure that seals off a first space from a second space.

"Fasteners" mean leak-tight fasteners with respect to fluids.

"Fluids" mean liquids, gases, or liquids and gases.

"Hemi-enclosure" means a component of an enclosure.

"Ions" mean aqueous ions.

"Line-of-sight" means light traveling in a straight line.

"Reticulated" means aqueous pathways constructed or arranged like a net or network.

"Transition pieces" mean elements that transition to different shapes.

"Water" means pure water, impure water, electrolytes, and all water solutions.

"Zone" means an area of a hemi-enclosure or an enclosure having a particular characteristic, purpose, or use.

At least two hemi-enclosures are required to form an enclosure. A hemi-enclosure includes at least three zones: (1) a first end-zone; (2) a mid-zone; and (3) a second end-zone. A hemi-enclosure may be fabricated from discontinuous objects, such as by fastening discrete zone components. A hemi-enclosure may instead be fabricated as a single continuous object. Hemi-enclosures may be constructed in various shapes and sizes. For example, the mid-zone may be substantially cylindrical with cross-sections that include semi-circular, semi-elliptical, and/or semi-rectangular shapes. The mid-zone can also be non-cylindrical with a variable cross-section. The end-zones may be flat, partially conical, partially spheroidal, or partially ellipsoidal, as examples. The end-zones can comprise specialized adaptations such as bottom supports or flow pathways.

One embodiment of an apparatus for the electrolytic splitting of water into hydrogen and oxygen gases may include (i) a first hemi-enclosure; (ii) a second hemi-enclosure; (iii) a diaphragm electrode array positioned between the first hemi-enclosure and the second hemi-enclosure comprising: (a) a diaphragm, that passes ions and impedes the passage of gases, comprising a first side and a second opposed side; (b) a first plurality of electrodes in a first vicinity of the first side of the diaphragm; and (c) a second plurality of electrodes in a second vicinity of the second opposed side of the diaphragm; (iv) a fastener, for leak-tight fastening of the first hemi-enclosure, the diaphragm electrode array, and the second hemi-enclosure, whereby a leak-tight enclosure is formed; (v) electrical contacts, for electrically powering the first and second pluralities of electrodes, and; (vi) pathways configured to separately remove hydrogen and oxygen gases from the enclosure. In some embodiments, a hemi-enclosure is a single continuous object. In other embodiments, a hemi-enclosure is comprised of discrete zone components.

Examples of diaphragm materials include the following reticulated and/or porous materials: organic composites, inorganic composites, plastics, asbestos, asbestos fibers, glass fibers, PTFE, paper, felt, fiber, polymers, polypropylene, asbestos sheet, composite fiber sheet, PVC, asbestos on screens, copolymers, ceramics, coated asbestos, styrene, $Al_2O_3$, $SiO_2$, $ZrO_2$, and glass fibers, as examples.

Examples of electrical power sources that power the electrolyzer apparatus include photovoltaic cells, wind power electrical generators, renewable energy electrical generators, nuclear energy electrical generators, and fossil fuel powered electrical generators.

In some embodiments of an electrolyzer apparatus, the gas removal pathways comprise a headspace barrier, whereby a first headspace of a first hemi-enclosure is separated from a second headspace of a second hemi-enclosure; a first flow pathway fluidly connected to the first hemi-enclosure; and a second flow pathway, fluidly connected to the second hemi-enclosure.

In some embodiments, the first flow pathway is comprised of a first top end-zone connected to a first mid-zone and a first pipe; and the second flow pathway is comprised of a second top end-zone connected to a second mid-zone and a second pipe. Examples of top end-zone shapes include flat plates, partially conical, partially spheroidal, partially elliptical, and partially rectangular shapes.

The first pipe and the second pipe may be external to the hemi-enclosures. Alternatively, the first pipe and the second pipe may be external and internal to the hemi-enclosures. Some embodiments include baffles and hydrophilic surfaces to minimize evaporative water loss by water vapor surface condensation. Some embodiments include heat sink technology to minimize evaporative water loss by heat exchange with ambient temperature.

In some embodiments of diaphragm electrode arrays, the electrodes are comprised of wires. The wire material is a metal, alloy, semiconductor, superconductor, compound, carbon, carbon fiber or conductive polymer, as examples. The surfaces of the wires can be texturized to increase the actual surface areas over the apparent surface areas and modified by the addition of catalysts. In some embodiments, the wires are substantially parallel to a first side of a diaphragm and a second opposed side of the diaphragm. In other embodiments, electrodes are deposited by deposition technology such as photolithography, electroless plating, inking, vapor deposition or conductive painting, as examples.

Multiple methods of fabricating diaphragm electrode arrays are disclosed such as the use of wire applying and/or wire winding machine technology. For example, a method for making a diaphragm electrode array for use in an electrolyzer apparatus comprises: (i) mounting a diaphragm that passes ions and impedes the passage of gases on a wire-applying machine; (ii) applying wire in a first vicinity of a first side of the diaphragm and in a second vicinity of a second opposed side of the diaphragm using the wire-applying machine; (iii) fastening a first hemi-enclosure, the wire, the diaphragm, and a second hemi-enclosure, whereby a leak-tight enclosure is formed, and; (iv) trimming the wire; whereby a diaphragm electrode array for use in an electrolyzer apparatus and the electrolyzer apparatus are made. Specific examples of wire-applying methods include (i) progressive axial rotational wire winding; (ii) progressive orbital rotational wire winding; (iii) serpentine wire winding; (iv) progressive axial rotational latch wire winding; and (v) multi-stranded positional applying of wire.

An electrolyzer apparatus comprises (i) a first hemi-enclosure; (ii) a second hemi-enclosure; (iii) a diaphragm electrode array sandwiched between the first hemi-enclosure and the second hemi-enclosure, wherein the diaphragm electrode array is made using a method of wire winding and/or wire application; (iv) pathways, configured to separately remove hydrogen and oxygen gases from the enclosure; and (v) electrical contacts, for electrically powering the apparatus.

A high temperature electrolysis apparatus comprises electrical contacts that are separated from the high-temperature of the electrolyzer. The temperature of electrical contact is less than the operating temperature of the electrolyzer. The temperature differential is achieved by increasing the distance between the region of electrical contact and the heated region of the high temperature electrolyzer and by heat exchange between the contacts and ambient temperature.

An apparatus and method for educating students in the science and technology of renewable energy production is disclosed. The method is tied to specific embodiments of the disclosed electrolyzers that transform water into hydrogen and oxygen. The apparatus and method address integrating science and engineering practices into K-12 science curricula, as described in the National Science Teachers Association Reader's Guide to *A Framework for K-12 Science Education,* © 2012, NSTA, Arlington, Va., 77 pages, and is incorporated by reference in its entirety. The disclosed apparatus is a utilitarian teaching tool for the conversion of electrical energy into chemical energy. The apparatus interacts with pumps, separators, compressors and storage units that teach the scientific and engineering principles of renewable energy production, storage, distribution and utilization.

The disclosed embodiments of the diaphragm electrode arrays can be used to fabricate membrane electrode assemblies for fuel cells.

The disclosed electrolyzers can be used for industrial processes other than water electrolysis for the production of hydrogen and oxygen. One such process is the chlor-alkali process.

Hemi-enclosures comprising an electrolyzer apparatus may be similar or substantially identical. They are configured to be of complementary form such that they sandwich a diaphragm electrode array to form a leak-tight enclosure and permit fluid connections for gas and/or liquid removal and electrical powering of electrodes at electrode contacts. The fasteners can be loosened or cut to permit access to the diaphragm electrode array for maintenance, servicing and/or replacement while generating minimum scrap and opportunities for re-use of materials. A hemi-enclosure is fabricated by machining, casting, molding, spinning, laminating, forging, rolling, extruding, drawing, bending, spinning, punching, blanking, sawing, tapping, broaching, boring, turning, drilling, milling, grinding, cutting, electro discharge machining, as examples. It can be comprised of biomaterials, carbon, ceramics, composite materials, glass, nanomaterials, refractory materials, semiconductors, thin films, functionally graded materials and carbon polymers such as polyvinylchloride, polyethylene, polypropylene, and polycarbonate, as examples.

A hemi-enclosure can be fabricated as a single continuous object, or from discrete component zones. The hemi-enclosures include pathways for gas removal. Hemi-enclosures may function as clamping tools for manufacturing diaphragm electrode arrays that facilitate the use of manufacturing techniques for fabricating the disclosed electrolyzer apparatus embodiments. The manufacturing techniques include for example, robotics, robot vision, machine vision, and digitally-controlled motion and wire positioning machines.

FIGS. 1A and 1B illustrate exploded and assembled views, respectively, of an embodiment of an electrolyzer apparatus comprising continuous zone hemi-enclosures. A first hemi-enclosure 101 and a second hemi-enclosure 103 sandwich a diaphragm electrode array 105. The diaphragm electrode array 105 is comprised of a first plurality of electrodes 107 in a first vicinity of a first side of a diaphragm 109. A second plurality of electrodes, not visible in FIG. 1, is in a second vicinity of a second opposed side of the diaphragm 109. A dividing line 111 separates the diaphragm 109 from a headspace barrier 113. The headspace barrier 113 is impermeable to ions, gases and water. A water fill mark 115 indicates the level of water in the enclosure. The location of the fill mark 115 is approximately midway between the dividing line 111 and the tops of the hemi-enclosures 101 and 103. FIG. 1B illustrates an assembled perspective view of an electrolyzer apparatus 117. A first plurality of electrode contacts 119 are in a first vicinity of a first side of the diaphragm 109. A second plurality of electrode contacts, not visible in FIG. 1B, are in a second vicinity of a second opposed side of the diaphragm 109. The oxygen removal pathway and the hydrogen removal pathway permit oxygen and hydrogen removal separately from the electrolyzer apparatus 117 when water is added and electrical power is applied to the first and second pluralities of electrode contacts.

Figures 2A, 2B:
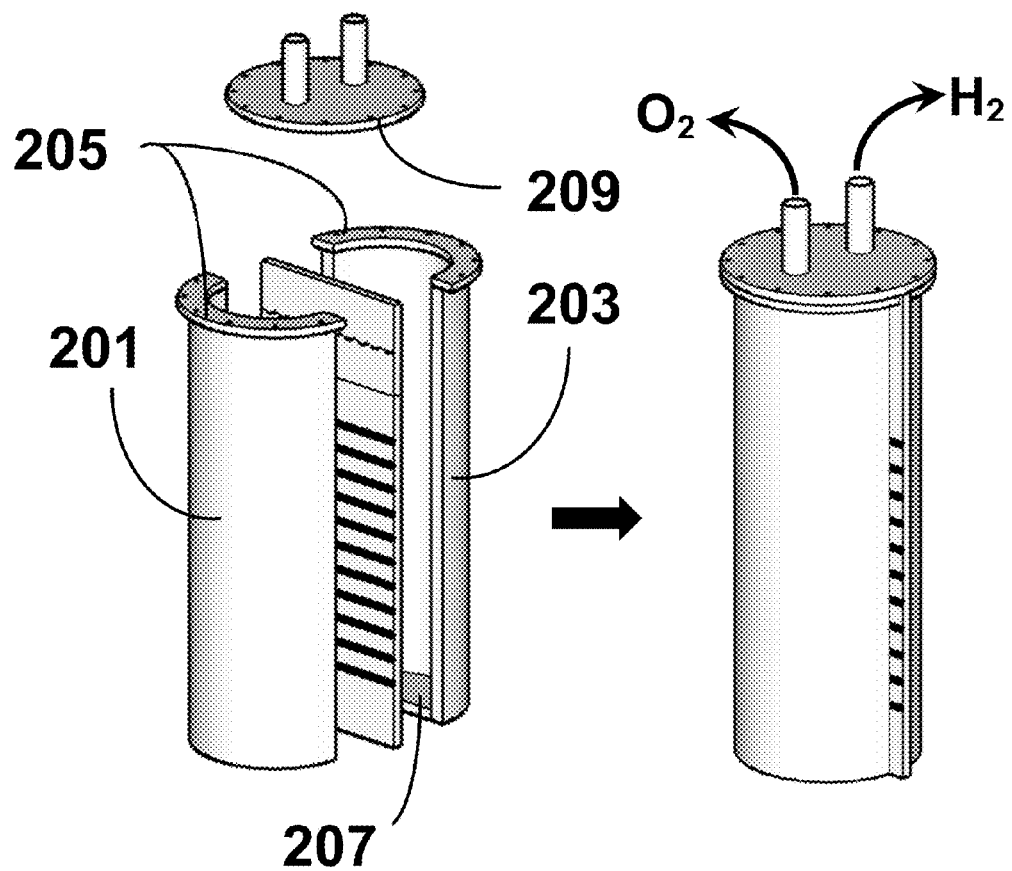
FIGS. 2A and 2B illustrate exploded and assembled views, respectively, of an embodiment of an electrolyzer apparatus comprising discrete component zone hemi-enclosures.

FIGS. 2A and 2B illustrate exploded and assembled views, respectively, of an embodiment of an electrolyzer apparatus comprising discrete component zone hemi-enclosures. A mid-zone 201 is a first mid-zone; a mid-zone 203 is a second mid-zone. End-zone mating flanges 205 and bottom plates 207 are fastened to the mid-zones. A leak-tight cover plate 209 comprising gas removal pathways mates with the mating flanges 205. The diaphragm electrode array, separation line and water fill mark of FIG. 2 are substantially the same as that of FIG. 1.

Figure 3A:
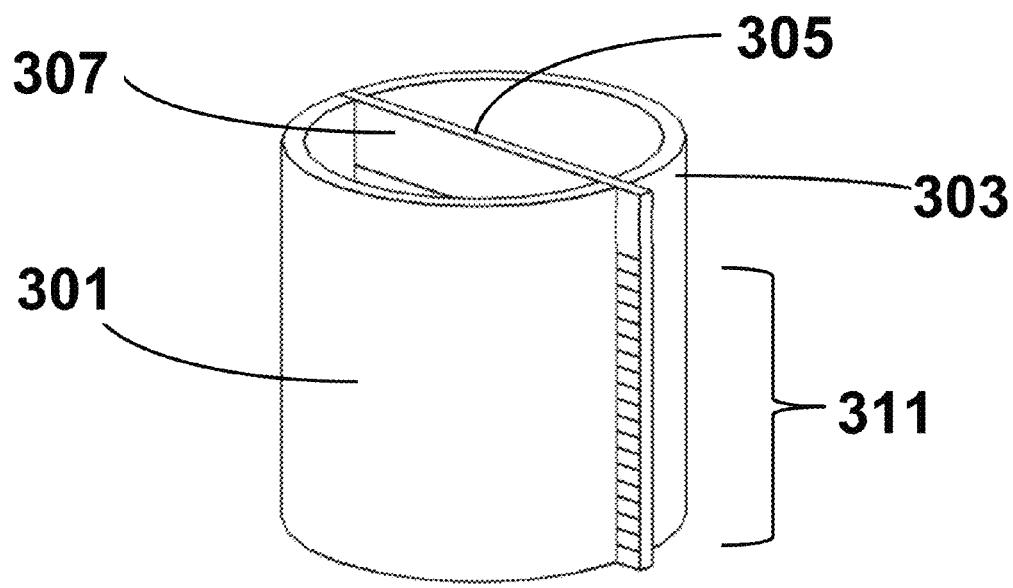
FIGS. 3A and 3B are front and rear perspective illustrations of the mid-zone region of an embodiment of an electrolysis apparatus comprising pluralities of electrodes in the vicinities of first and second opposed sides of a diaphragm.
Figure 3B:
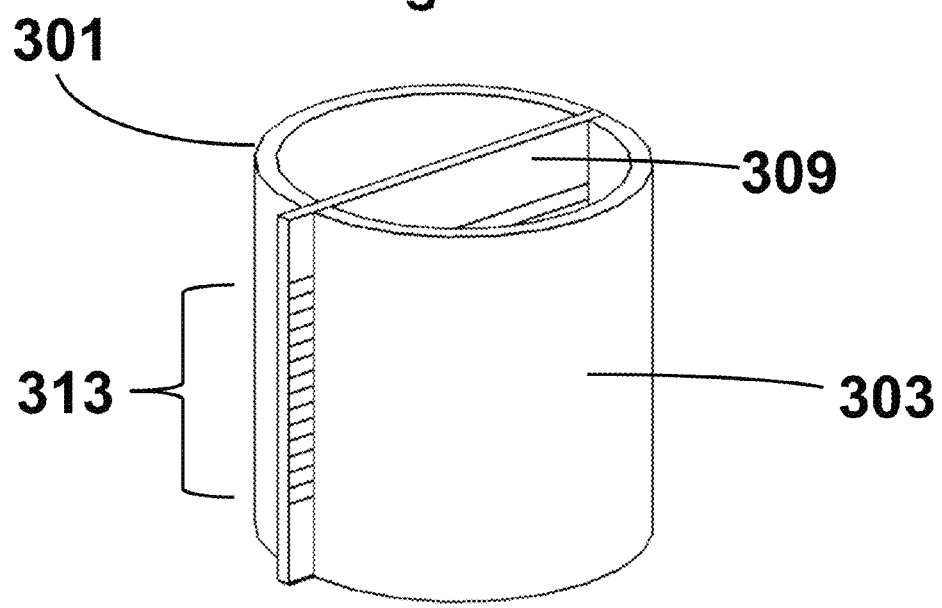

FIGS. 3A and 3B are front and rear perspective illustrations of the mid-zone region of an embodiment of an electrolysis apparatus comprising pluralities of electrodes in the vicinities of first and second opposed sides of a diaphragm. A mid-zone 301 is a first mid-zone. A mid-zone 303 is a second mid-zone. A diaphragm 305 comprises a first side 307 and a second opposed side 309. A first plurality of electrodes 311 is in a first vicinity of the first side 307 of the diaphragm 305. A second plurality of electrodes 313 is in a second vicinity of the second opposed side 309 of the diaphragm 305.

Figure 4:
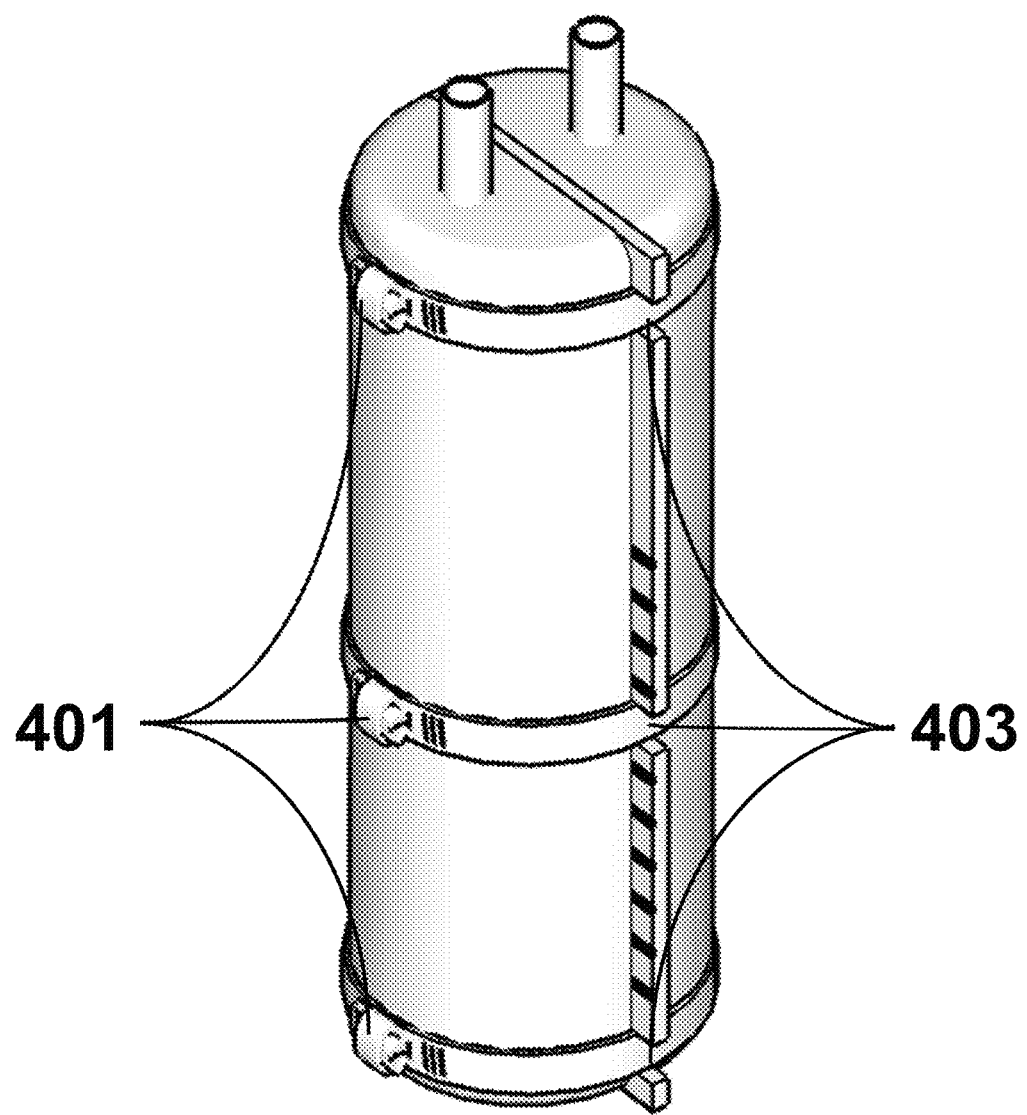
FIG. 4 illustrates the use of hose clamps for leak-tight fastening of an embodiment of an electrolyzer apparatus.

FIG. 4 illustrates the use of hose clamps 401 to fasten a first hemi-enclosure, a diaphragm electrode array, and a second hemi-enclosure. The fastened embodiment of FIG. 4 illustrates that the diaphragm electrode array is appropriately notched at sites 403 to accommodate the hose clamps. Fasteners for leak-tight fastening of embodiments of electrolyzers comprise clamps, such as hose clamps, Stauff clamps and strap clamps for example. Fasteners also comprise wire ties, cable ties, strapping, epoxy, adhesive gasket seals, aquarium adhesives, cements, washing machine adhesives, welding, heating, brazing, crimping, taping, gluing, wrapping, hinging, soldering, clipping, latching, anchoring, pinning, doweling, buckling, battening, clasping, clamping, directed energy, screws, flanges, bolts, nuts and/or selected combinations of one or more thereof. In some embodiments one or more of the foregoing fasteners are excluded.

Figure 5A:
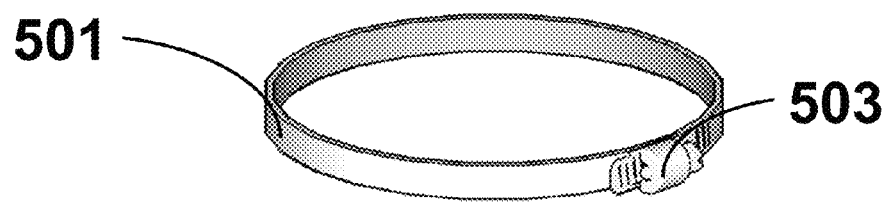
FIG. 5A illustrates a hose clamp.
Figure 5B:
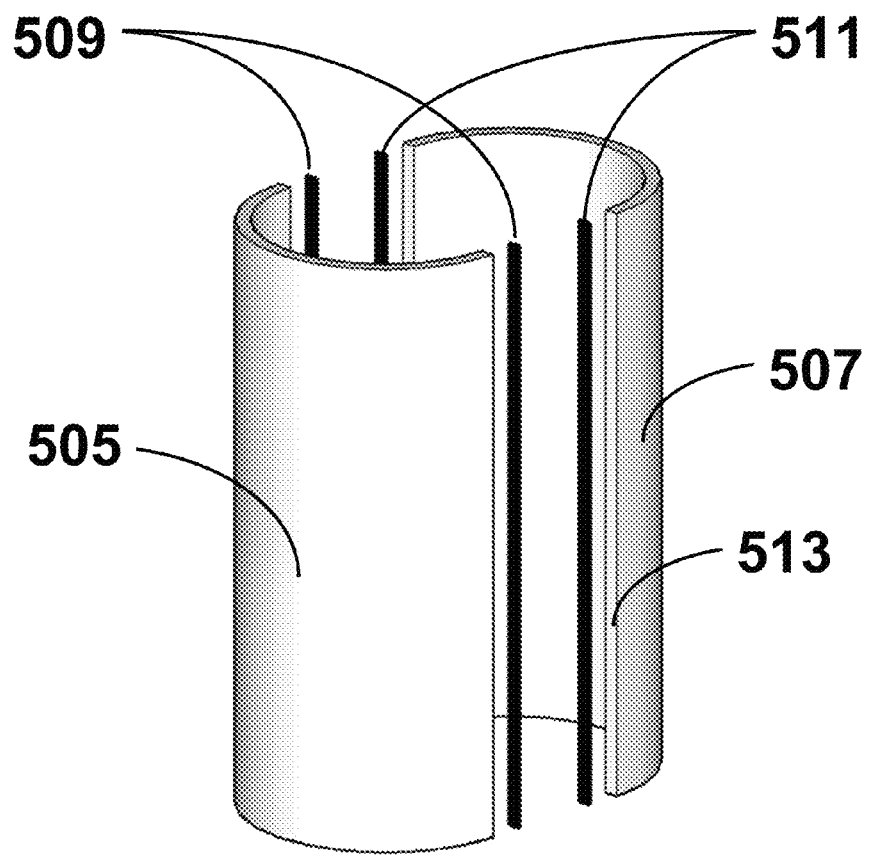
FIG. 5B illustrates the mid-zones of hemi-enclosures and gasket seals for leak-tight fastening of an embodiment of an electrolyzer apparatus.

FIG. 5A illustrates a hose clamp, and FIG. 5B illustrates mid-zones of hemi-enclosures, and gasket seals for leak-tight fastening of an embodiment of an electrolyzer apparatus. A circumference band 501 wraps around the circumference of the electrolysis apparatus and is tightened by the rotary motion of a worm gear assembly 503. FIG. 5B illustrates a first mid-zone 505 and a second mid-zone 507. A first pair of gasket strips 509 is adjacent to the first mid-zone 505. A second pair of gasket strips 511 is adjacent to the second mid-zone 507. The pluralities of gasket strips 509 and 511 provide additional leak-tight fastening and sealing capability by lining typical edges 513, and a diaphragm electrode array. For clarity, the diaphragm electrode array is not illustrated in FIG. 5B. Gaskets, including the addition of adhesives, sealants, cements, and epoxies are used in combination with any fastening clamps. Examples of gasket materials include rubber, Viton, neoprene, flexible graphite, carbon fiber, hypalon, urethane, silicone, PTFE, fluoroelastomers, fiberglass, and nylon.

Figure 6A:
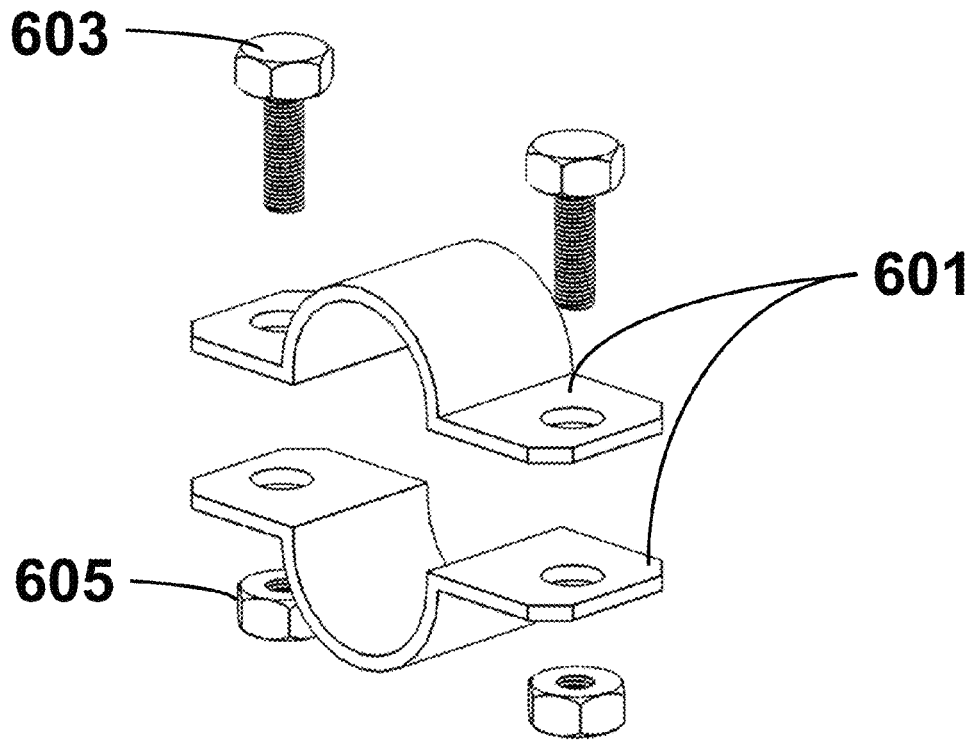
FIG. 6A illustrates a strap clamp.
Figure 6B:
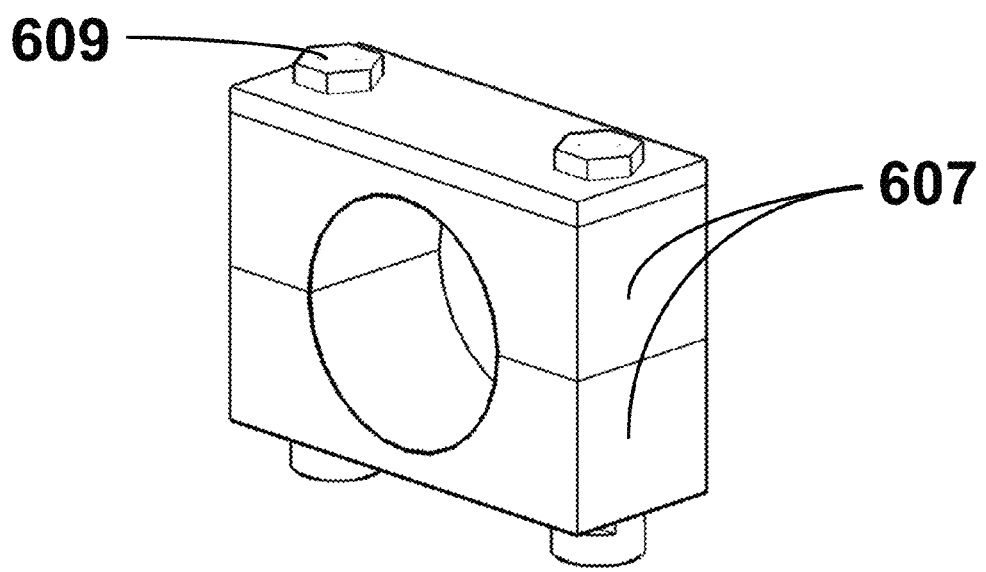
FIG. 6B illustrates a Stauff clamp, both for use in leak-tight fastening of embodiments of an electrolyzer apparatus.

FIG. 6A illustrates a strap clamp and FIG. 6B illustrates a Stauff clamp that may be used for leak-tight fastening of high temperature and/or high pressure embodiments of an electrolyzer apparatus. FIG. 6A is a strap clamp 601. Bolts 603 and nuts 605 are used to tighten the strap clamp 601. FIG. 6B is a Stauff clamp 607 with tightening bolts 609. Both clamps bind the circumference of approximately circular cross-section electrolyzer apparatuses and use rotary motion to fasten a first hemi-enclosure, a diaphragm electrode array and a second hemi-enclosure for leak-tight fastening of the electrolysis apparatus.

Figures 7A, 7B:
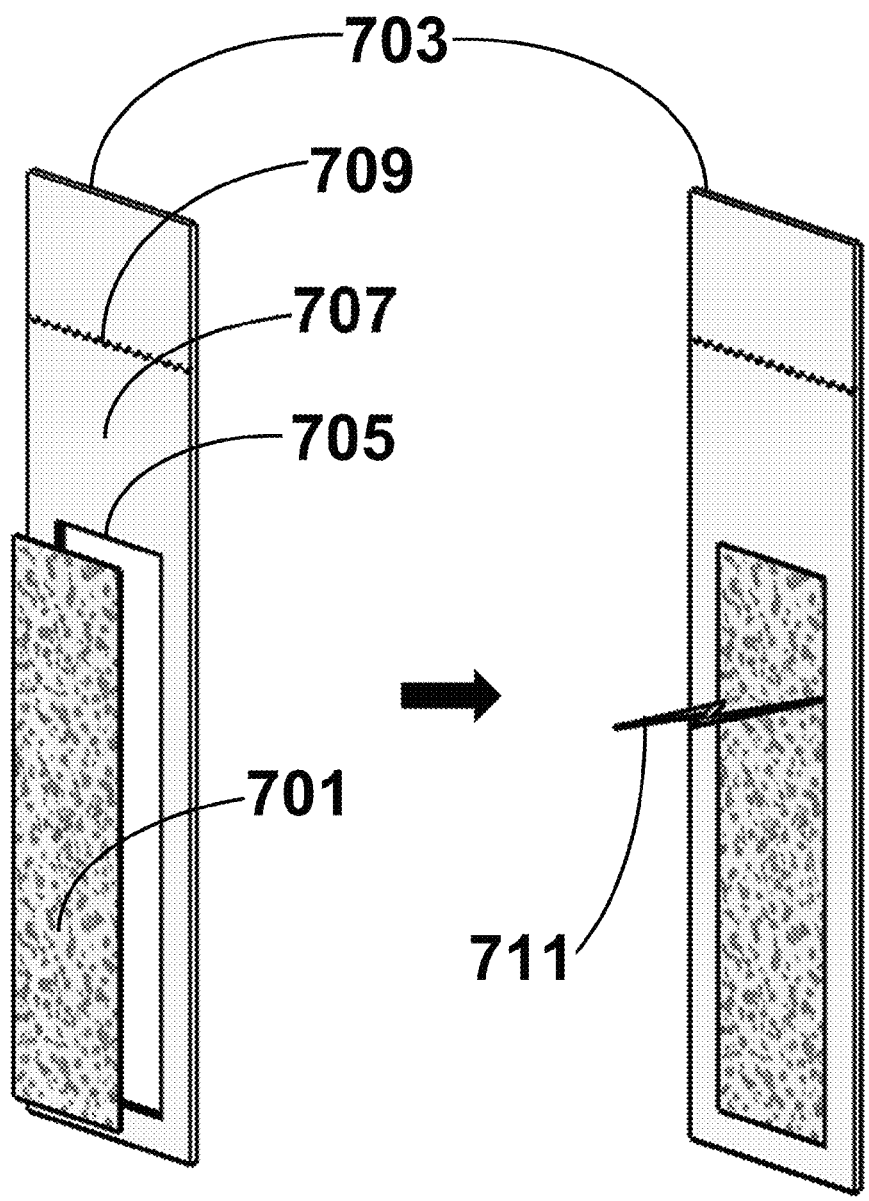
FIGS. 7A and 7B illustrate the use of directed energy for sealing a diaphragm in an impermeable frame.

FIGS. 7A and 7B illustrate the use of directed energy for sealing a diaphragm 701 in an impermeable frame 703. FIG. 7A illustrates an exploded view of the diaphragm 701 adjacent to the impermeable frame 703. The frame 703 is impermeable to ions, gases and water. The impermeable property of the frame 703 is part of the leak-tight seal around the edges of the apparatus where the components meet. An edge 705 at the top of the cutout separates the diaphragm 701 from a headspace barrier 707. A water fill level 709 indicates the level of water in the electrolyzer apparatus. The level 709 is approximately midway between the edge 705 and the top edge of the frame 703. FIG. 7B is an assembled view. The diaphragm 701 is fastened in the frame 703 using a fastener 711. The fastener 711 includes directed energy, heating, welding, soldering, fusing and gluing, as examples.

Figures 8A, 8B:
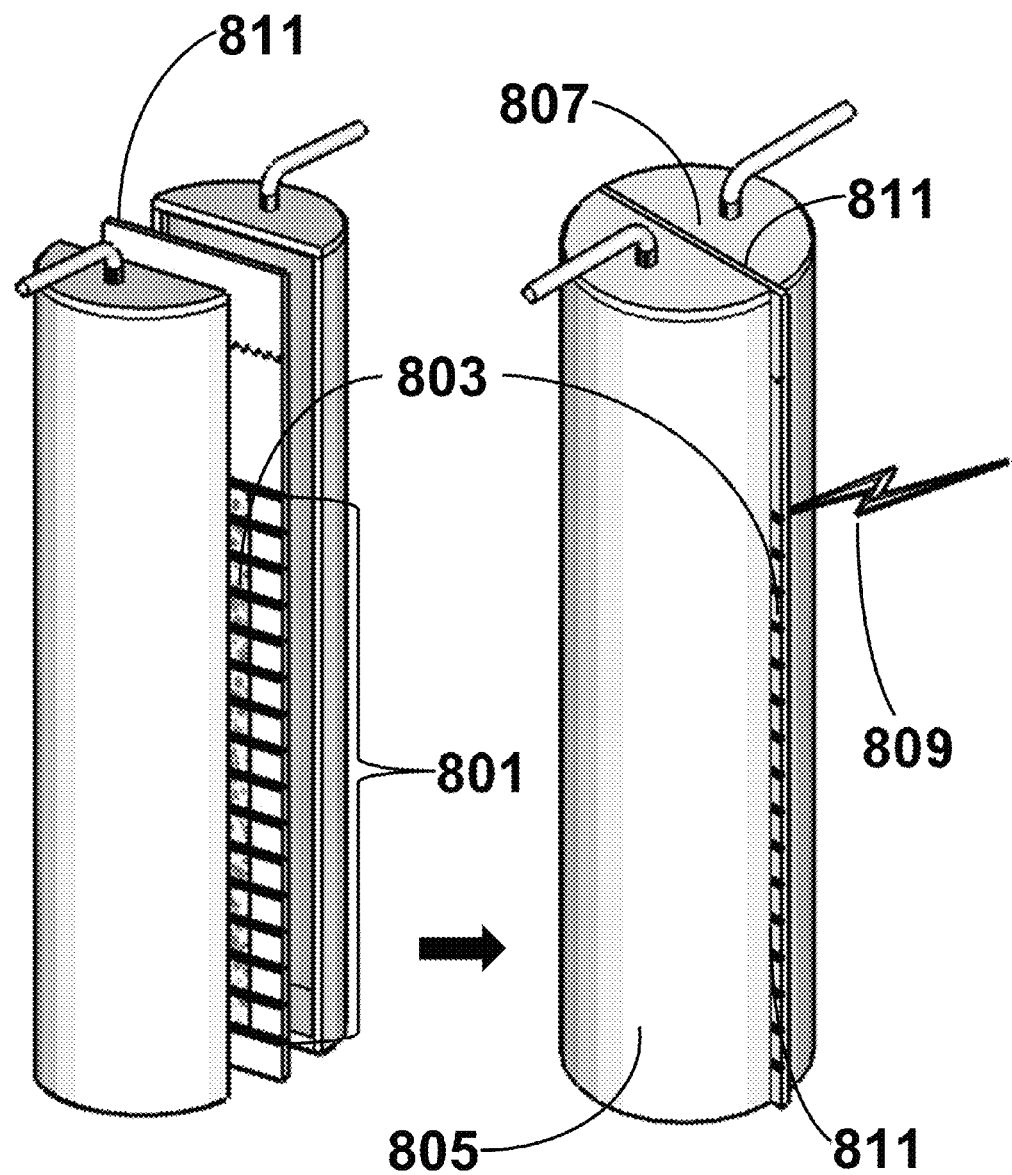
FIGS. 8A and 8B illustrate the use of directed energy for leak-tight fastening of an embodiment of an electrolyzer apparatus.

FIGS. 8A and 8B illustrate the use of directed energy for leak-tight fastening of an embodiment of an electrolyzer apparatus. FIG. 8A illustrates an exploded perspective view of an embodiment of the disclosed electrolyzer apparatus. A first plurality of electrodes 801 is in a first vicinity of a first side of the framed diaphragm of FIG. 7. A second plurality of electrodes, not visible in FIG. 8, is in a second vicinity of a second opposed side of the framed diaphragm. FIG. 8B illustrates an assembled perspective view of a diaphragm electrode array 803 sandwiched between a first hemi-enclosure 805 and a second hemi-enclosure 807. Leak-tight fastening of the first hemi-enclosure 805, the diaphragm electrode array 803, and the second hemi-enclosure 807 is achieved by a fastener 809 applied at edges 811 where the components meet. The fastener includes directed energy, heating, welding, soldering, fusing and gluing, as examples.

Figures 9A, 9B:
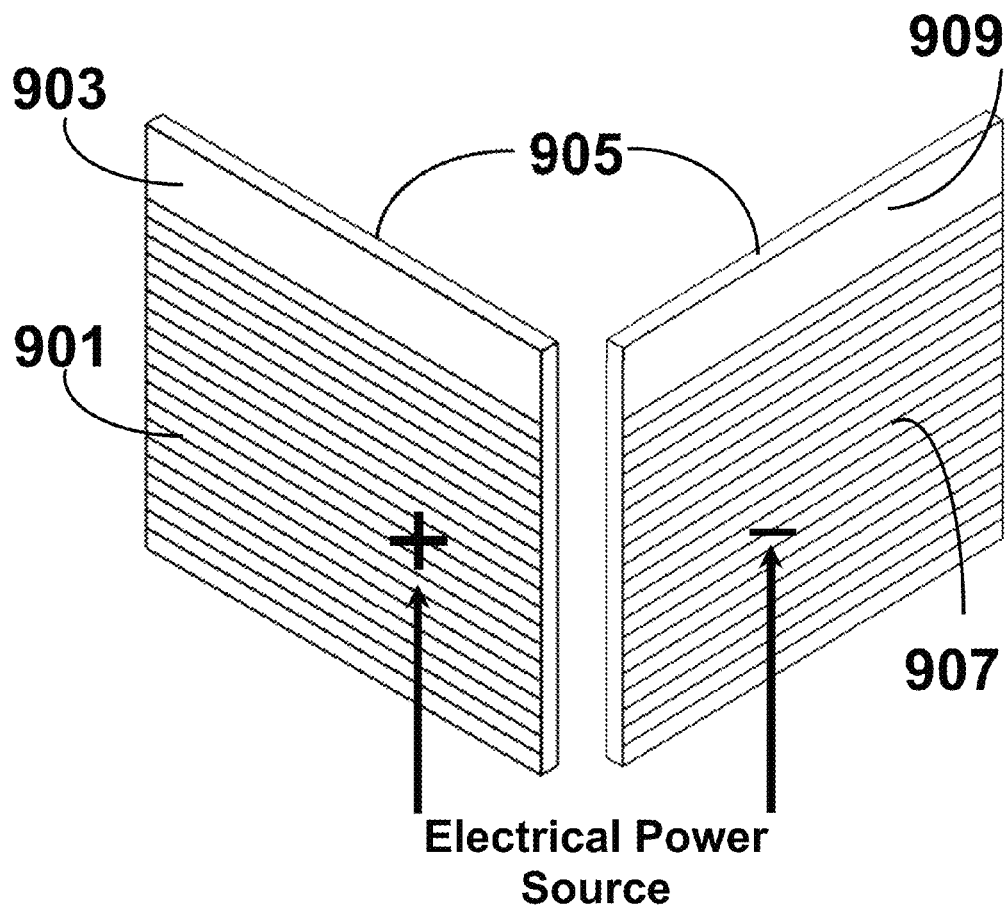
FIGS. 9A and 9B illustrate anode side and cathode side perspective views of an electrical power source applying electrical power to anode and cathode pluralities of electrodes in vicinities of opposed sides of a diaphragm.

FIGS. 9A and 9B illustrate anode side and cathode side perspective views, respectively, of an electrical power source applying electrical power to anode and cathode pluralities of electrodes in vicinities of opposed sides of a diaphragm. FIG. 9A illustrates an anode electrode perspective view and FIG. 9B illustrates a cathode electrode perspective view of a diaphragm electrode array. A plurality of anode electrodes 901 is located in a first vicinity of a first side 903 of a diaphragm 905. A plurality of cathode electrodes 907 is located in a second vicinity of a second opposed side 909 of the diaphragm 905. The anode output of at least one electrical power source collectively contacts the plurality of anode electrodes 901. The cathode output of at least one electrical power source collectively contacts the plurality of cathode electrodes 907.

Figure 10:
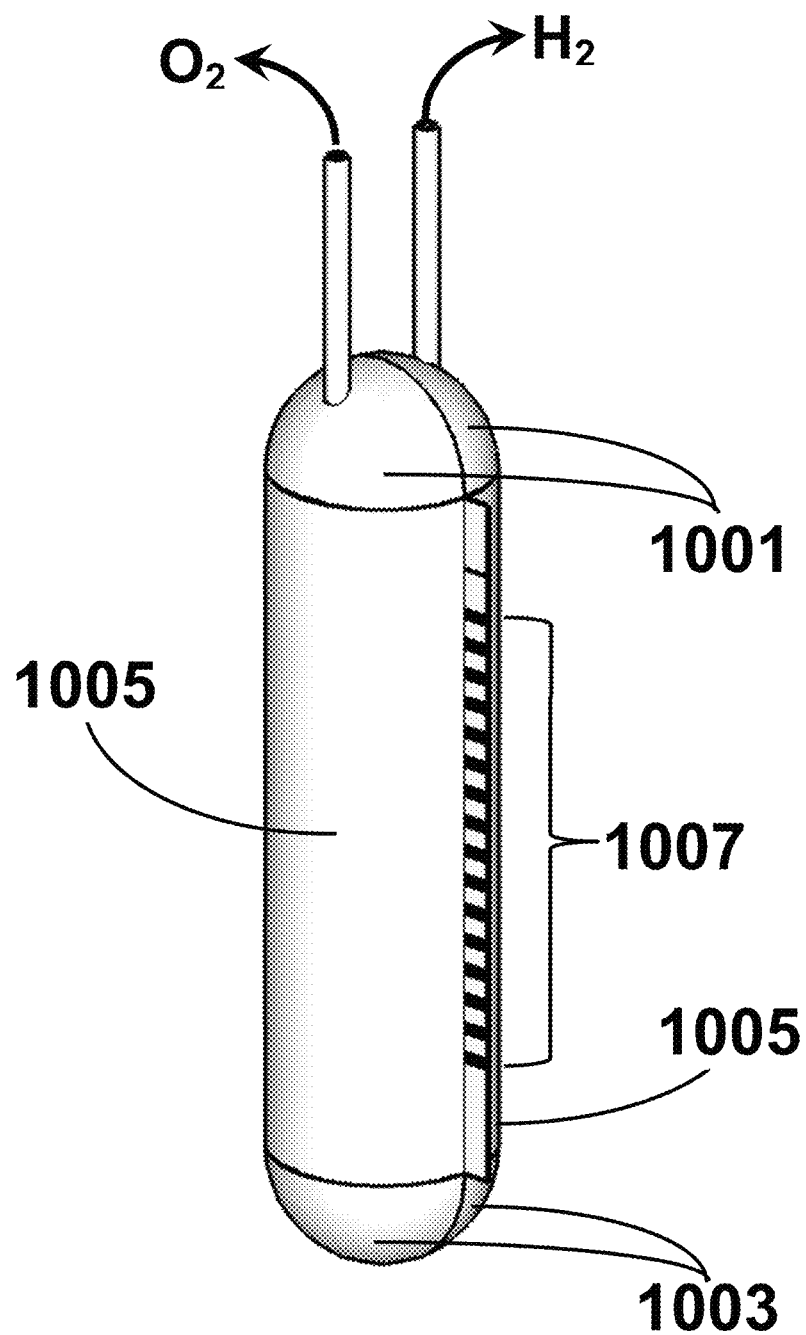
FIG. 10 illustrates an assembled perspective view of an embodiment of an electrolyzer apparatus wherein the hemi-enclosures are comprised of partially spheroidal discrete end-zone components.

In some embodiments, the end zones of the hemi-enclosures are substantially flat. Substantially flat bottoms may be advantageous for electrolyzers that are configured as standing structures. In other embodiments, the end zones of the hemi-enclosures are partially or substantially spheroidal or ellipsoidal. These end zone shapes may be advantageous for high pressure and high temperature electrolyzers. For example, FIG. 10 illustrates an assembled view of an embodiment of an electrolyzer apparatus wherein the hemi-enclosures are comprised of partially spheroidal discrete first end-zone components 1001 and partially spheroidal discrete second end-zone components 1003. Mid-zones 1005 are substantially cylindrical. A first plurality of electrical contacts 1007 protrude beyond the enclosure formed by fastening the hemi-enclosures and diaphragm electrode array. A second plurality of electrical contacts on the opposed side of the diaphragm, not visible in FIG. 10, protrude beyond the enclosure formed by fastening the hemi-enclosures and the diaphragm electrode array. In FIG. 10, end-zone components 1001 comprise pipes for hydrogen and oxygen removal from the cathode and anode sides of the diaphragm electrode array.

Figures 11A, 11B:
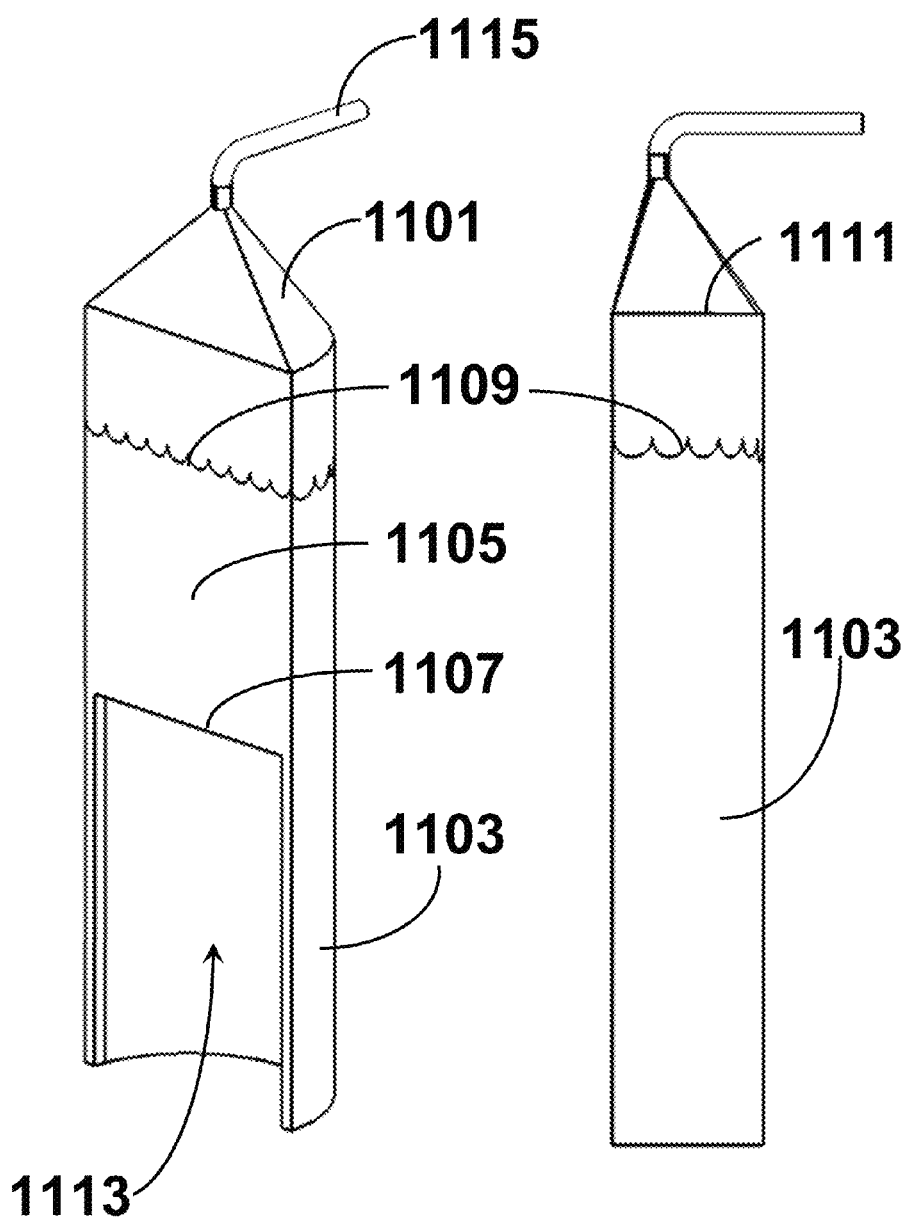
FIGS. 11A and 11B illustrate cut-away perspective and elevation views, respectively, of a hemi-enclosure comprising a transition piece end-zone embodiment of an electrolyzer apparatus.

FIGS. 11A and 11B illustrate cut-away perspective and elevation views, respectively, of a hemi-enclosure comprising a transition piece end-zone embodiment of an electrolyzer apparatus. FIG. 11A contains a cutaway perspective view illustrating an electrolyzer embodiment comprising tapered top end-zones 1101 and cylindrical mid-zones 1103. For clarity, the diaphragm electrode array and bottom end-zones are not illustrated in FIG. 11. A headspace barrier 1105 starts above an edge 1107 that also marks the location of the upper edge of the diaphragm electrode array. A mark 1109 indicates the fill level of water in the electrolyzer. The mark 1109 is between the edge 1107 and an edge 1111 that marks the transition to taper of the end-zone 1101. An arrow 1113 points to the interior of the mid-zone 1103, the space that contains water. The top end-zone 1101 captures gas bubbles that rise in the water and enter the headspace above the mark 1109. The top end-zone 1101 funnels the gas in the headspace to a flow pipe 1115 which is fluidly connected to the headspace for gas removal and subsequent use or storage. The pipe 1115 can be directed downward and externally fastened to the mid-zone 1103 for stability and thermal contact. The headspace above the mark 1109 can be fitted with baffles and coated with hydrophilic surfaces to minimize evaporative water loss by water vapor adsorption. Examples of hydrophilic materials include acrylics, amine-functional polymers, ethers, styrenes, vinyl acids, and vinyl alcohols. Water is consumed during the electrolysis process. Replacement water is added to the electrolyzer as needed.

Figures 12A, 12B:
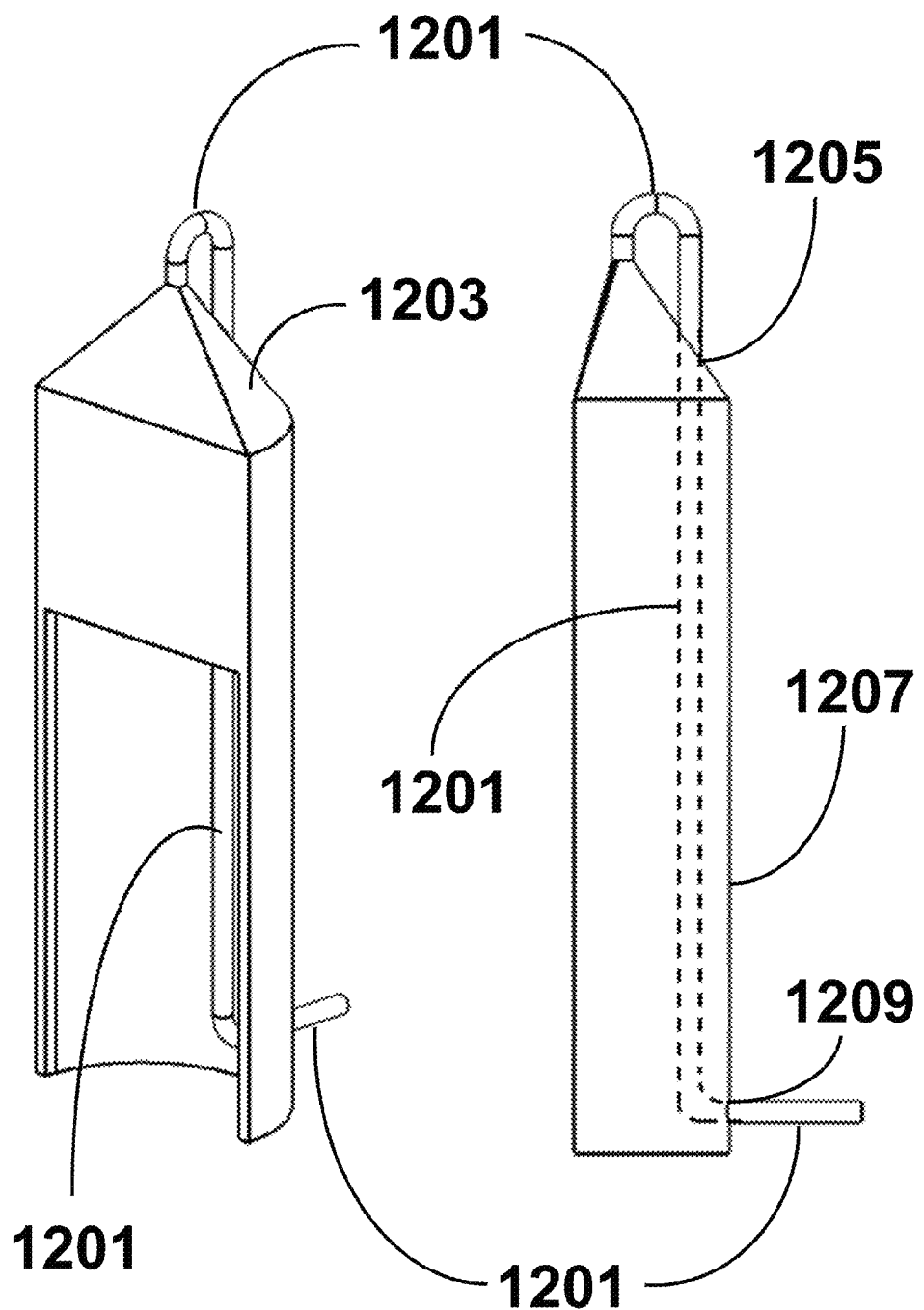
FIGS. 12A and 12B illustrate cut-away perspective and elevation views, respectively, of an embodiment of an electrolyzer apparatus wherein a gas removal flow pipe is external and internal to the apparatus.
Figure 13:
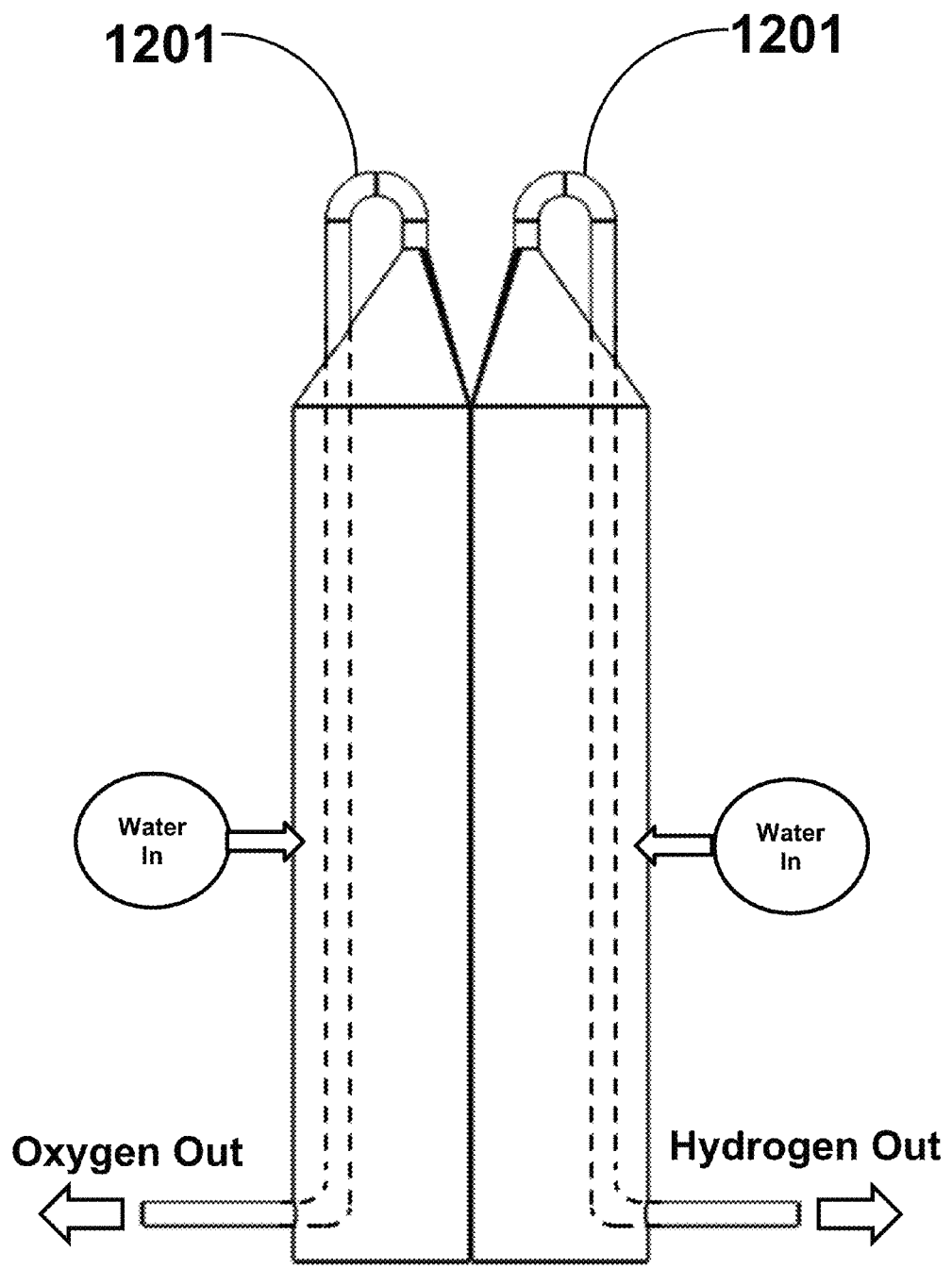
FIG. 13 illustrates an assembled elevation view of the embodiment of FIG. 12 showing the electrolyzer apparatus producing streams of hydrogen and oxygen with replacement water added as needed.

FIGS. 12A and 12B illustrate cut-away perspective and elevation views, respectively, of an embodiment of an electrolyzer apparatus wherein a gas removal flow pipe is external and internal to the apparatus. FIG. 12A contains a perspective view of a gas removal flow pipe 1201 that is external and internal to the electrolyzer. Upon emerging from a top end-zone 1203, the pipe 1201 turns approximately 180 degrees, pierces the end-zone 1203, at a location 1205, indicated in FIG. 12B, re-enters the interior, descends downward through the headspace and water and emerges near the bottom of the electrolyzer by piercing a mid-zone 1207 at a location 1209. All the piercings are leak-tight. The embodiment of FIG. 12 may provide multiple advantages. First, external exposure of the pipe 1201 to ambient temperature upon emerging from the end-zone 1203 may allow for cooling of the gas carried within the pipe 1201 prior to re-entry into the apparatus. The cooled gas may be used to cool the water used for electrolysis by heat exchange and reduce evaporative water loss. Second, as further indicated in FIG. 13, the internal plumbing of the pipe 1201 may provide for self-contained modular replication units for construction of large-scale hydrogen and oxygen production systems, where many units are replicated and whose flow pathways merge into larger streams of gas production. The internal containment of the pipes of the flow pathways may minimize the potential for pipe breakage due to shielding by the mid-zones. Third, as also indicated in FIG. 13, this embodiment may possess safety features since separate streams of hydrogen and oxygen are produced in the cathode and anode compartments of the electrolyzer apparatus that can be directed to flow in opposite directions and with subterranean placement of the gas flow streams, thereby minimizing potential hazards of producing and handling large quantities of combustible gases. FIG. 13 also illustrates acts of addition of water to the electrolyzer apparatus to replace water that is consumed by electrolysis and lost to evaporation.

Figure 14:
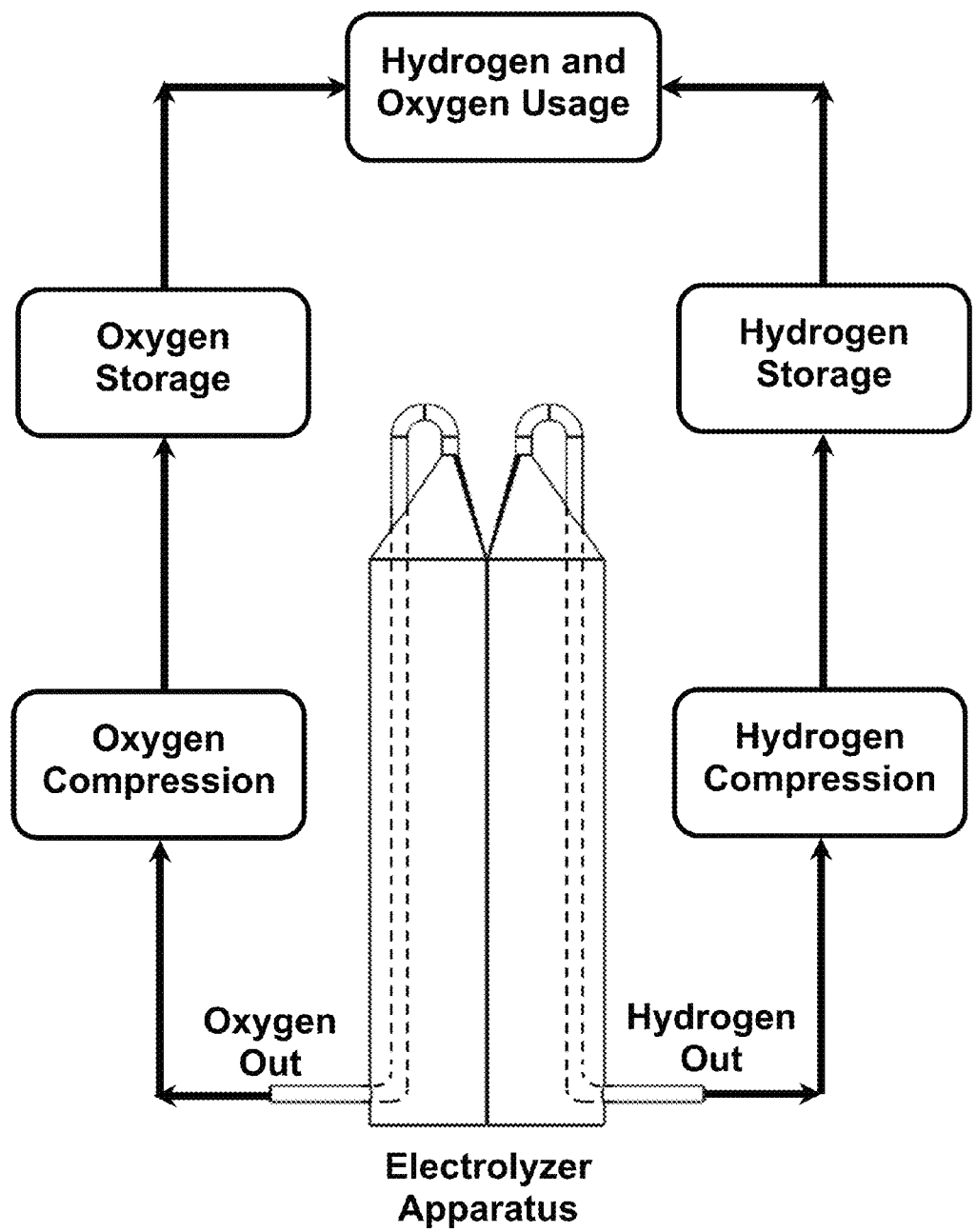
FIG. 14 illustrates a flow diagram, system-level overview of how the embodiment of FIG. 13 may be used as part of a large-scale production, storage, and utilization system.

FIG. 14 illustrates a flow diagram, system-level overview of how the embodiment of FIG. 13 may be used as part of a large-scale production system that includes gas compression, storage, distribution, and usage. Photovoltaic electricity is an intermittent source of energy because sunlight is available intermittently. Wind generated electricity is not always available. The system of FIG. 14 illustrates how solar and wind energy can be captured and stored for use at a later time. Nuclear energy generated electricity can also be used for the electrolytic production of hydrogen and oxygen. The nuclear reactors can be located in relatively remote regions and the hydrogen that is produced can be transported in pipelines to centers of use.

Figure 15:
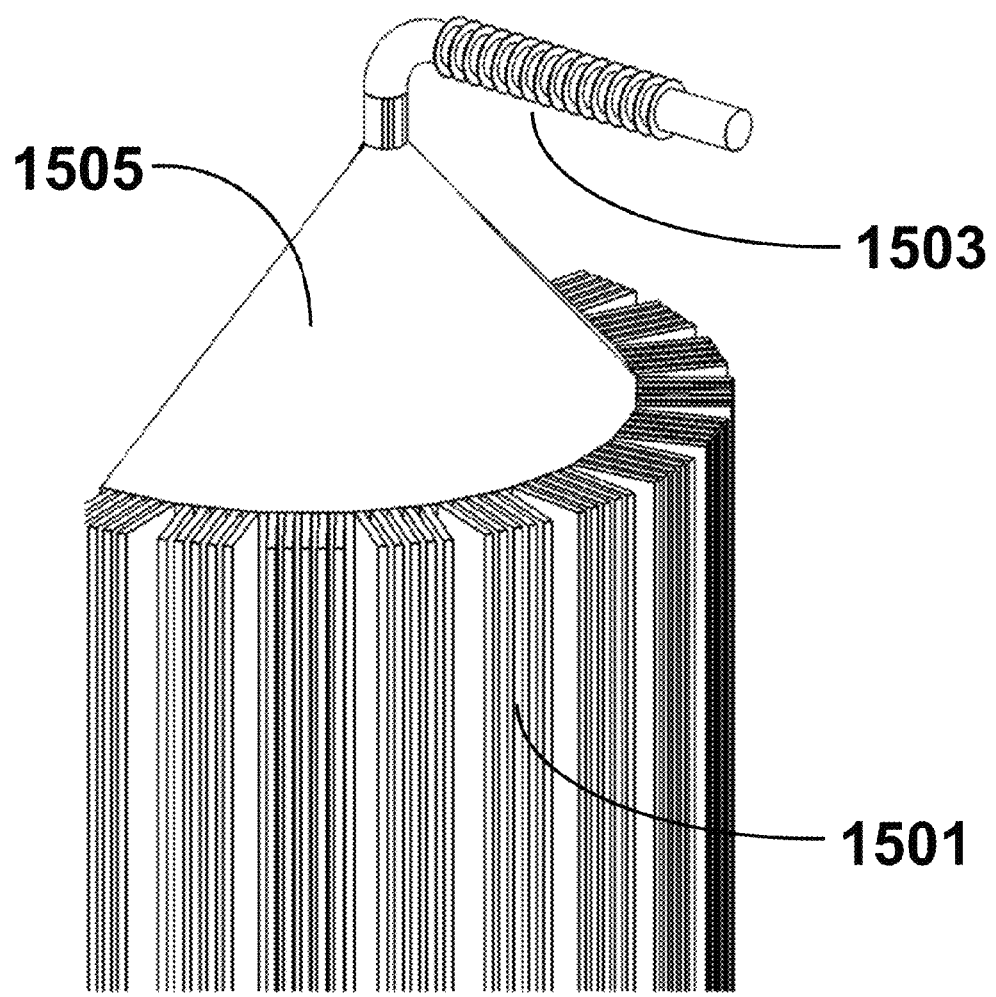
FIG. 15 illustrates a detailed perspective view of an embodiment of an electrolyzer apparatus that includes heat sinks.

FIG. 15 illustrates a detailed perspective view of an embodiment of an electrolyzer apparatus that includes heat sinks for heat exchange with the ambient environment. Thermally conducting fins 1501 are applied to the mid-zones of the hemi-enclosures. Heat sink technology for heat exchange can also be applied to a pipe 1503 and an end-zone 1505. The utility of heat sink technology can be further enhanced by selecting thin-walled thermally conducting materials for fabrication of the hemi-enclosures.

Some embodiments of an electrolyzer apparatus combine busbar connectors with heat sink technology for cooling and suppressing water evaporation. FIGS. 16A, 16B, and 16C illustrate a perspective view, top view, and front elevation view, respectively, of a busbar electrically contacting a first plurality of electrodes and comprising heat sinks. A first plurality of electrodes 1601 in a first vicinity of a first side of a diaphragm 1603 electrically and thermally contacts a busbar 1605. The busbar 1605 further comprises one or more heat sink fins 1607 that are cooled by heat exchange with surrounding fluids. A similar second busbar with heat sink fins makes electrical and thermal contact with a second plurality of electrodes in a second vicinity on a second opposed side of the diaphragm 1603. For clarity, the second busbar with second heat sink fins are not illustrated in FIG. 16. "Busbars" are bars of electrical conductors that contact a plurality of electrodes on their respective sides of the diaphragm and also connect to the electrical power source that powers the electrolyzer apparatus.

Figure 17A:
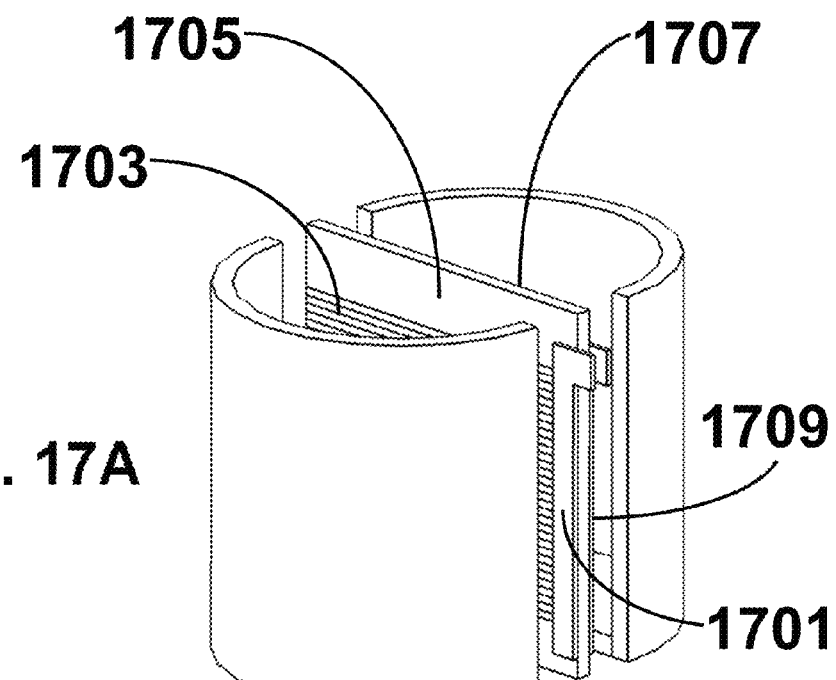
FIGS. 17A and 17B illustrate exploded and assembled mid-zone perspective views, respectively, of contact strips with bond tabs making electrical contact with pluralities of electrodes on opposed sides of a diaphragm.
Figure 17B:
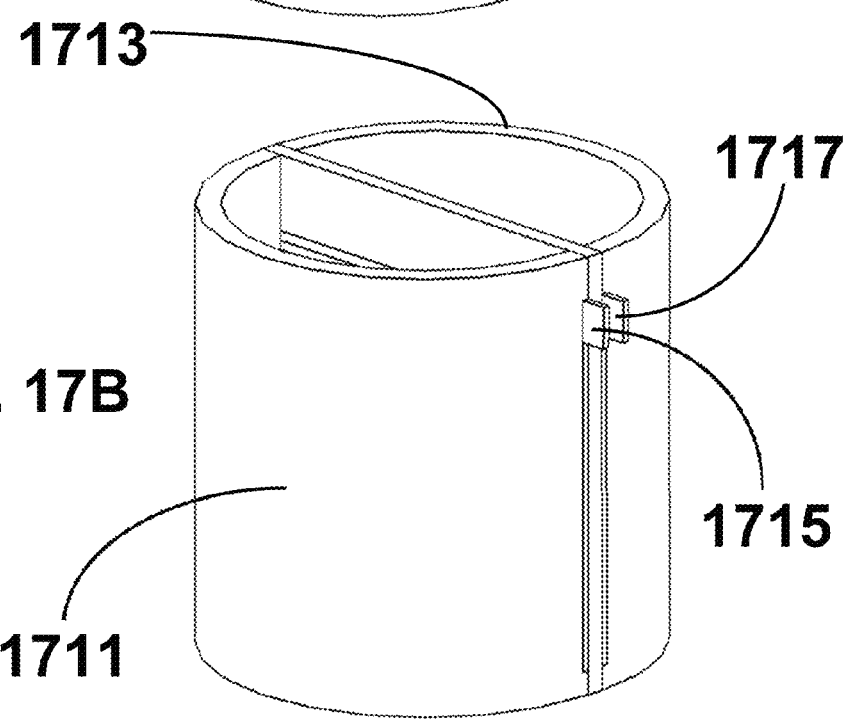

In some embodiments, the diaphragm and electrodes do not protrude beyond the hemi-enclosures. In these embodiments electrical contact with the respective pluralities of electrodes is made with strips of metal that are sandwiched between the edges of the hemi-enclosures that appress the diaphragm electrode array. Exposed faces and edges of the diaphragm are sealed to prevent fluids from leaking out of the electrolyzer. Sealers include hose clamps, wire ties, cable ties, strapping, epoxy, adhesive gasket seals, aquarium sealant, washing machine sealant, welding, heating, directed energy and/or selected combinations of one or more thereof. FIGS. 17A and 17B illustrate exploded and assembled mid-zone perspective views, respectively, of contact strips with bond tabs making electrical contact with pluralities of electrodes on opposed sides of a diaphragm. A first electrical contact strip 1701 makes electrical contact with a first plurality of electrodes 1703 in a first vicinity of a first side 1705 of a diaphragm 1707. A second electrical contact strip 1709 makes electrical contact with a second plurality of electrodes, not visible in FIG. 17, in a second vicinity of a second opposed side of the diaphragm 1707. As illustrated in FIG. 17B, the electrical contact strips 1701 and 1709 are appressed to the first and second pluralities of electrodes on their respective sides by a first hemi-enclosure 1711 and a second hemi-enclosure 1713. A first electrical contact tab 1715 is electrically connected to the first electrical contact strip 1701. A second electrical contact tab 1717 is electrically connected to the second electrical contact strip 1709. The electrical contact tabs extend beyond the first and second hemi-enclosures, whereby contact with an electrical power source is made.

The degree of protrusion of the diaphragm and electrodes beyond the assembled hemi-enclosures is increased for the design and construction of high temperature electrolyzers. FIGS. 18A, 18B, 18C, and 18D illustrate mid-zone perspective, top, front, and right elevation views, respectively, of a high temperature electrolyzer apparatus comprising an extended electrical contact region. An increased protrusion 1801 for electrical contact at an electrical contact edge 1803 is sufficiently large such that the temperature of the electrical contact edge 1803 is less, due to heat exchange with an ambient environment temperature, than the temperature of a heated region 1805 and a heated region 1807 of the electrolyzer. For high temperature steam electrolysis, the electrical contact edge 1803 may be positioned beneath heated regions 1805 and 1807, a location that further favors a lower temperature of the electrical contact edge 1803 due to thermal convection. All externally exposed edges and faces of the diaphragm are sealed to prevent leakage.

Figures 19A, 19B:
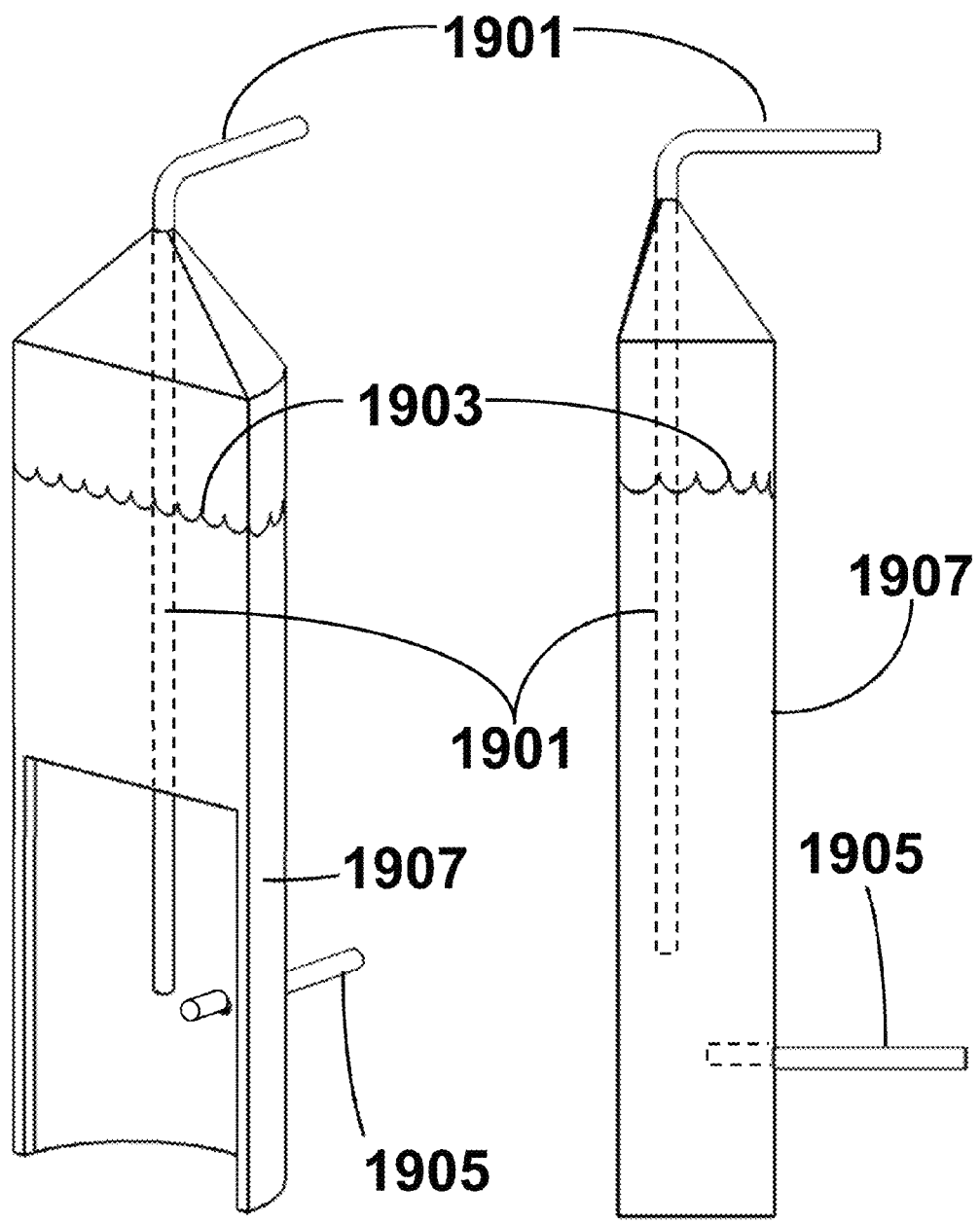
FIGS. 19A and 19B illustrate cut-away perspective and elevation views, respectively, of a hemi-enclosure for an embodiment of the electrolyzer apparatus for use with circulatory water pumps.

FIGS. 19A and 19B illustrate perspective and elevation cut-away views, respectively, of a hemi-enclosure for an embodiment of the electrolyzer apparatus for use with circulatory water pumps. A water removal pipe 1901 is submerged beneath a water level mark 1903. A water return pipe 1905 pierces a hemi-enclosure 1907 below the water level mark 1903. For clarity, the diaphragm electrode array and bottom zone are not illustrated in FIG. 19.

Figure 20:
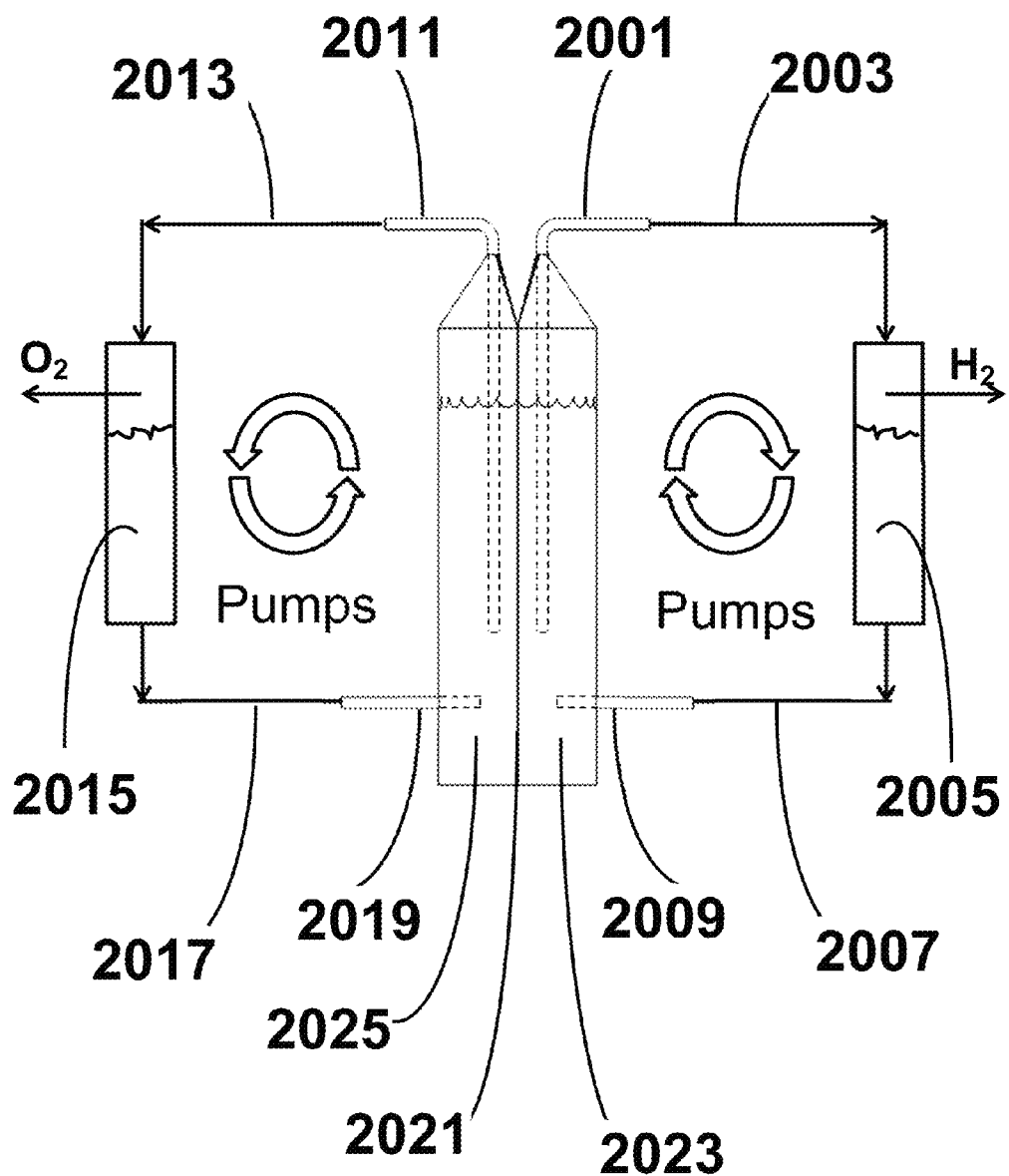
FIG. 20 illustrates an example of a system that utilizes the apparatus of FIG. 19.

FIG. 20 illustrates an example of a system that utilizes the apparatus of FIG. 19. In FIG. 20, the assembled FIG. 19 electrolyzer embodiment is a component of a larger system. In FIG. 20, hydrogen gas-containing water is removed from the electrolyzer via a removal pipe 2001 and sent via a path 2003 to a hydrogen-separation/removal unit 2005 for separation of hydrogen gas from the water. The hydrogen-depleted water is returned to the electrolyzer via a return pathway 2007 and a return pipe 2009. Similarly, in a separate circulatory flow system, oxygen gas-containing water is removed from the electrolyzer via a removal pipe 2011 and sent via a path 2013 to an oxygen-separation/removal unit 2015 for separation of oxygen gas from the water. The oxygen-depleted water is returned to the electrolyzer via a return pathway 2017 and a return pipe 2019. The circulatory pumps may be operated in either direction. Location 2021 marks the position of a diaphragm electrode array that is sandwiched between a first hemi-enclosure 2023 a second hemi-enclosure 2025.

Figure 21A:
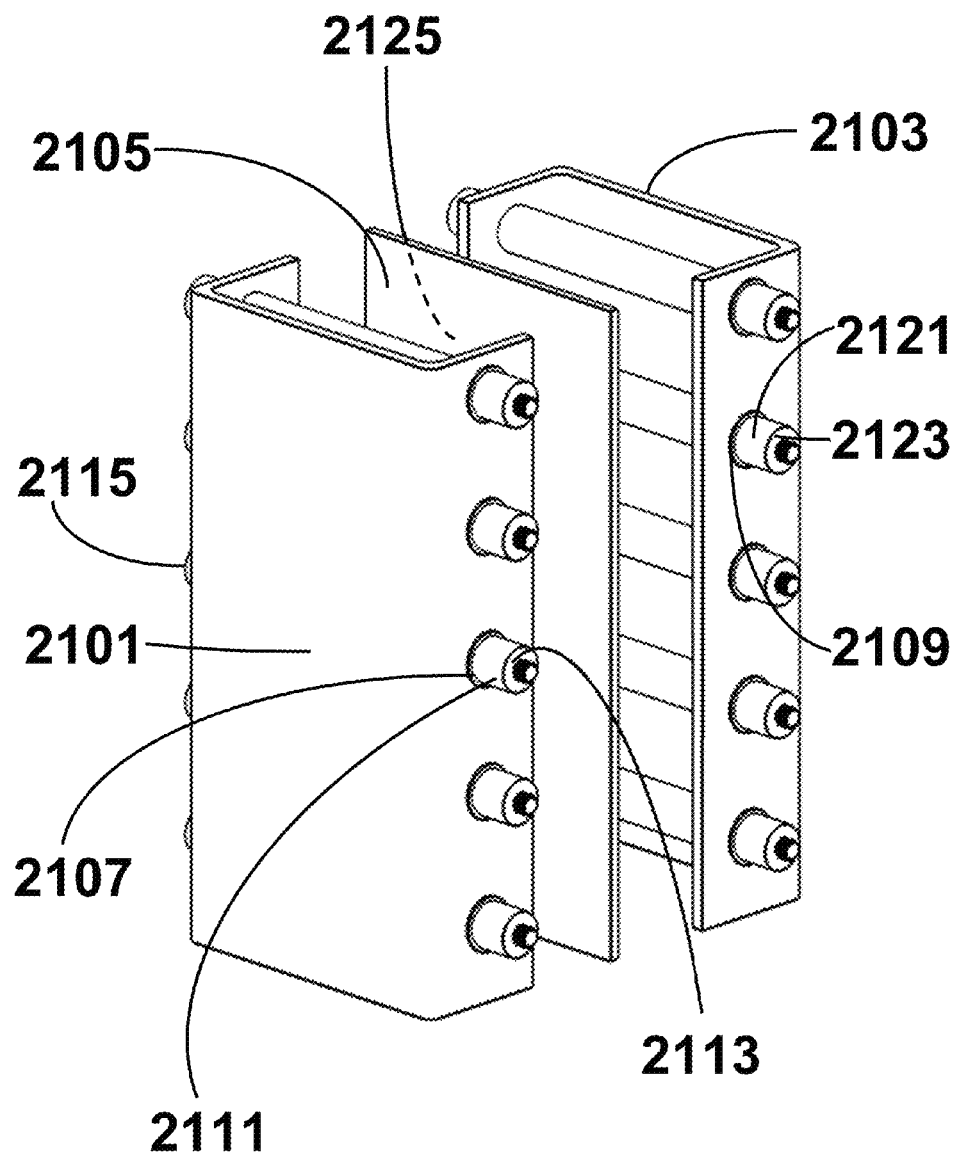
FIG. 21A illustrates a mid-zone exploded view of an electrolyzer apparatus comprising slideable electrodes.
Figure 21B:
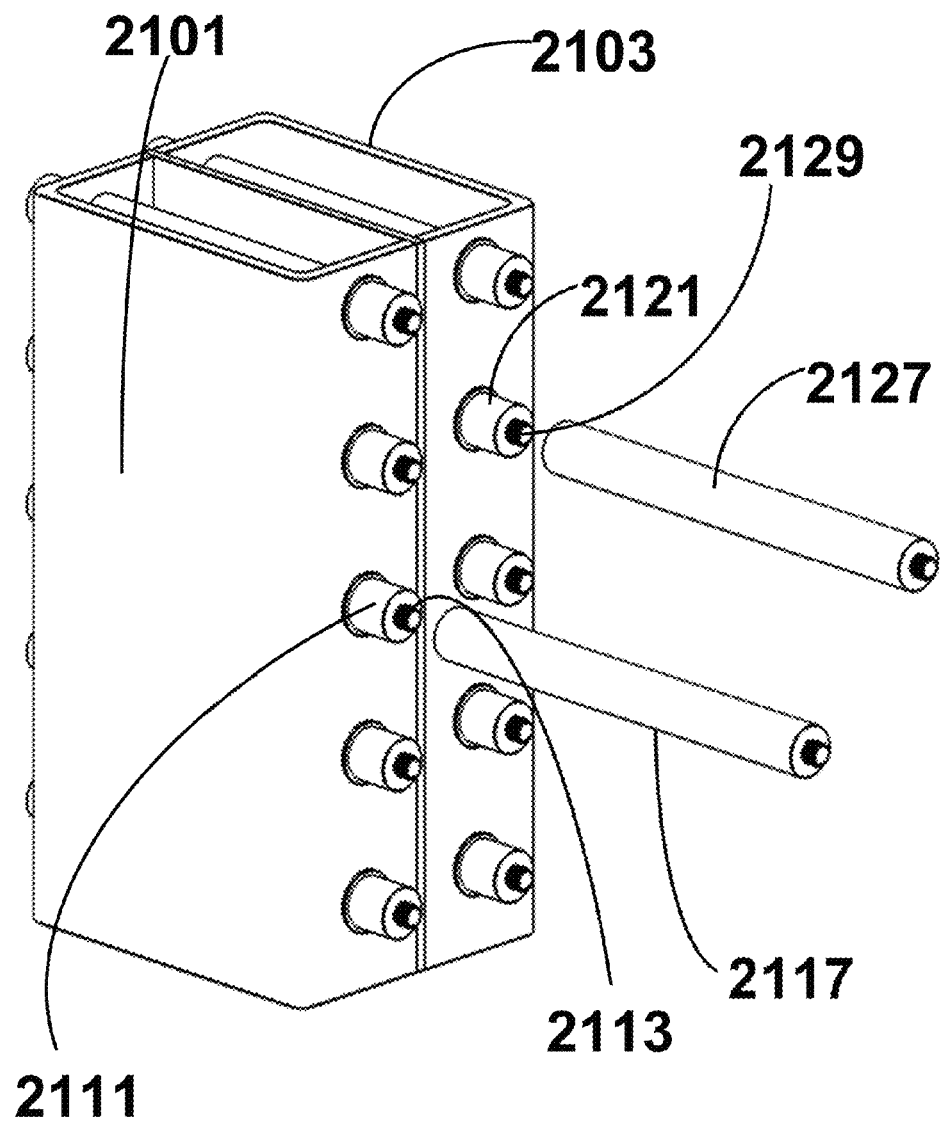
FIG. 21B illustrates a mid-zone assembled view of an electrolyzer apparatus comprising slideable electrodes with replacement electrodes adjacent to the electrodes that are to be replaced by sliding.
Figure 21C:
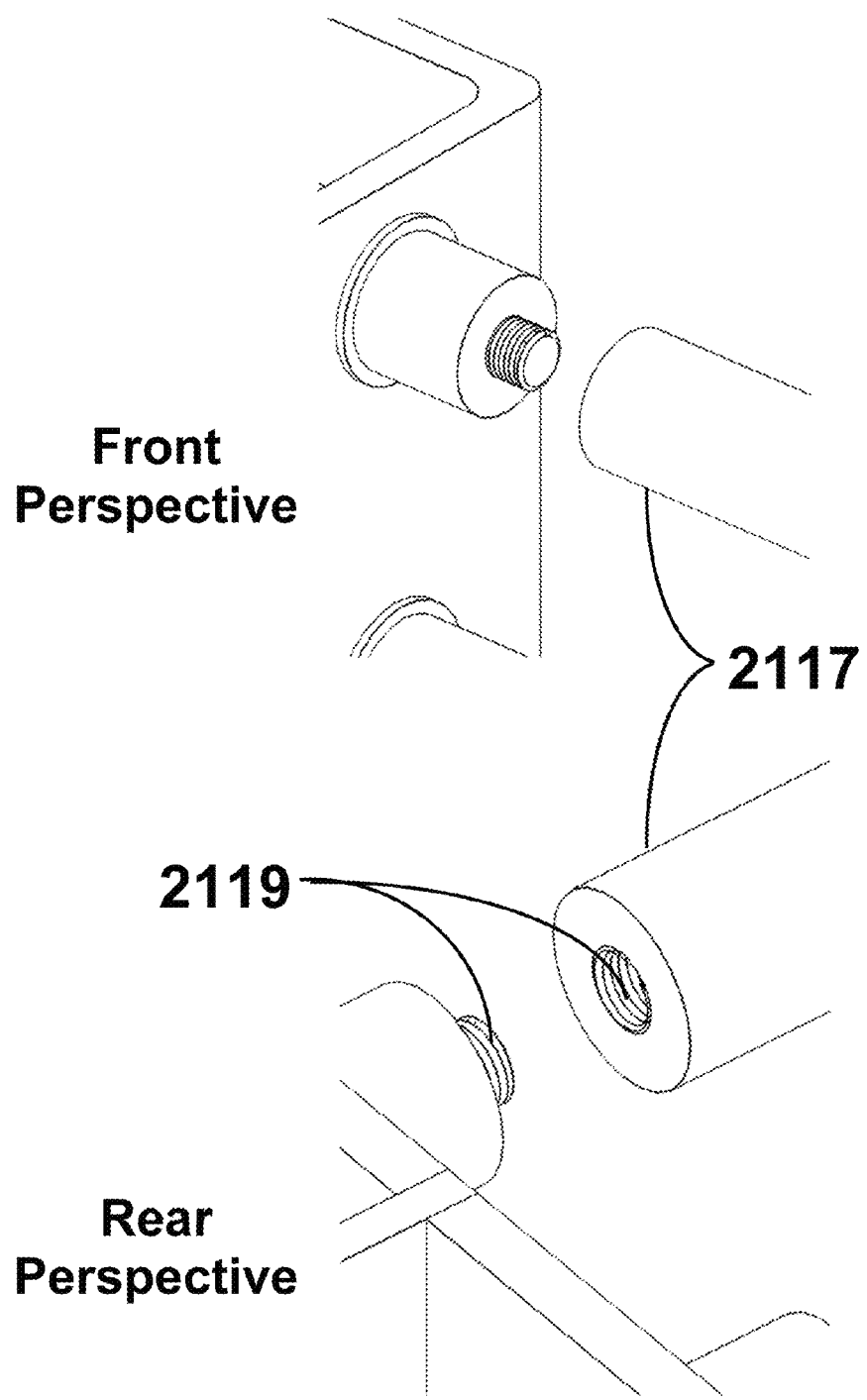
FIG. 21C illustrates detailed front and rear perspective views of fasteners for fastening an electrode in the electrolyzer apparatus to a replacement electrode for slideable replacement of the electrode in the apparatus.

There may be a need for electrolyzers with simplified electrode replacement and servicing. An embodiment of an electrolyzer apparatus is disclosed wherein removal of spent electrodes is achieved by sliding electrodes in and out of the electrolyzer without disassembly of the apparatus. The electrolyzer electrodes are held in place by compression O-ring or compression tube fittings, for example. By slightly loosening the fittings and fastening the replacement electrodes to the electrolyzer electrodes, replacement is achieved by sliding the electrodes to remove the spent apparatus electrodes and replacing them with new or refurbished replacement electrodes. FIG. 21A illustrates a mid-zone exploded view of an electrolyzer apparatus comprising slideable electrodes. FIG. 21B illustrates a mid-zone assembled view of an electrolyzer apparatus comprising slideable electrodes with replacement electrodes adjacent to the electrodes that are to be replaced by sliding. FIG. 21C illustrates detailed front and rear perspective views of fasteners for fastening an electrode in the electrolyzer apparatus to a replacement electrode for slideable replacement of the electrode in the apparatus. The electrolyzer apparatus comprises: (i) a first hemi-enclosure 2101; (ii)

a second hemi-enclosure 2103; (iii) a diaphragm 2105 positioned between the first hemi-enclosure 2101 and the second hemi-enclosure 2103; (iv) a fastener, not illustrated in FIG. 21, for leak-tight fastening the first hemi-enclosure 2101, the diaphragm 2105, and the second hemi-enclosure 2103; (v) at least one hermetic coupling pair 2107 in the first hemi-enclosure 2101 and at least one hermetic coupling pair 2109 in the second hemi-enclosure 2103 that are configured for slideably receiving and positioning at least one electrode in the first hemi-enclosure 2101 and at least one electrode in the second hemi-enclosure 2103, the rear element of the hermetic coupling pair 2107 and the rear element of hermetic coupling pair 2109 are not visible in FIG. 21; (vi) at least one electrode 2111 that is slideably and hermetically positioned in the first hemi-enclosure 2101, wherein the at least one electrode is comprised of a first end 2113 and a second end 2115; (vii) at least one replacement electrode 2117 (FIG. 21B) for the at least one electrode 2111 that is positioned in the first hemi-enclosure 2101; (viii) a fastener 2119, (FIG. 21C) for fastening the at least one replacement electrode 2117 (FIG. 21B) to the first end 2113 (FIG. 21A) or the second end 2115 of the at least one electrode 2111 in the first hemi-enclosure 2101, whereby the at least one electrode 2111 in the first hemi-enclosure is slideably removed from the first hemi-enclosure 2101 and is replaced with the at least one replacement electrode 2117 (FIG. 21B); (ix) at least one electrode 2121 (FIG. 21A) that is slideably and hermetically positioned in the second hemi-enclosure 2103, wherein the at least one electrode 2121 is comprised of a first end 2123 and a second end 2125; (x) at least one replacement electrode 2127 (FIG. 21B) for the at least one electrode 2121 that is positioned in the second hemi-enclosure 2103; and (xi) a fastener 2129, for fastening the at least one replacement electrode 2127 to the first end or the second end of the at least one electrode 2121 in the second hemi-enclosure 2103, whereby the at least one electrode 2121 in the second hemi-enclosure is slideably removed from the second hemi-enclosure 2103 and is replaced with the at least one replacement electrode 2127.

To electrolytically split water into hydrogen and oxygen, water is added to the electrolyzer apparatus and the electrodes are electrically powered. Electrical contact with the electrodes and the electrical power source can be achieved in multiple ways. For example, a single voltage or current source can be applied to a single anode/cathode pair. The source can be an electrical power supply that is comprised of at least one output pair. Also, edge connectors comprise multiple contact points that mate individually with electrode pairs of a plurality of anode/cathode electrodes that protrude beyond the hemi-enclosures. Examples of edge connectors may be found in the Digi-Key Corporation (Thief River Falls, Minn. 56701) catalog which is hereby incorporated by reference in its entirety.

A method for making a diaphragm electrode array for use in an electrolyzer apparatus is disclosed. The method comprises: (i) mounting a diaphragm, that passes ions and impedes the passage of gases, on a wire-applying machine; (ii) applying wire in a first vicinity of a first side of the diaphragm and in a second vicinity of a second opposed side of the diaphragm using the wire-applying machine; (iii) fastening a first hemi-enclosure, the wire, the diaphragm, and a second hemi-enclosure, whereby a leak-tight enclosure is formed, and; (iv) trimming the wire; whereby a diaphragm electrode array for use in an electrolyzer apparatus and the electrolyzer apparatus are made.

Figure 22A:
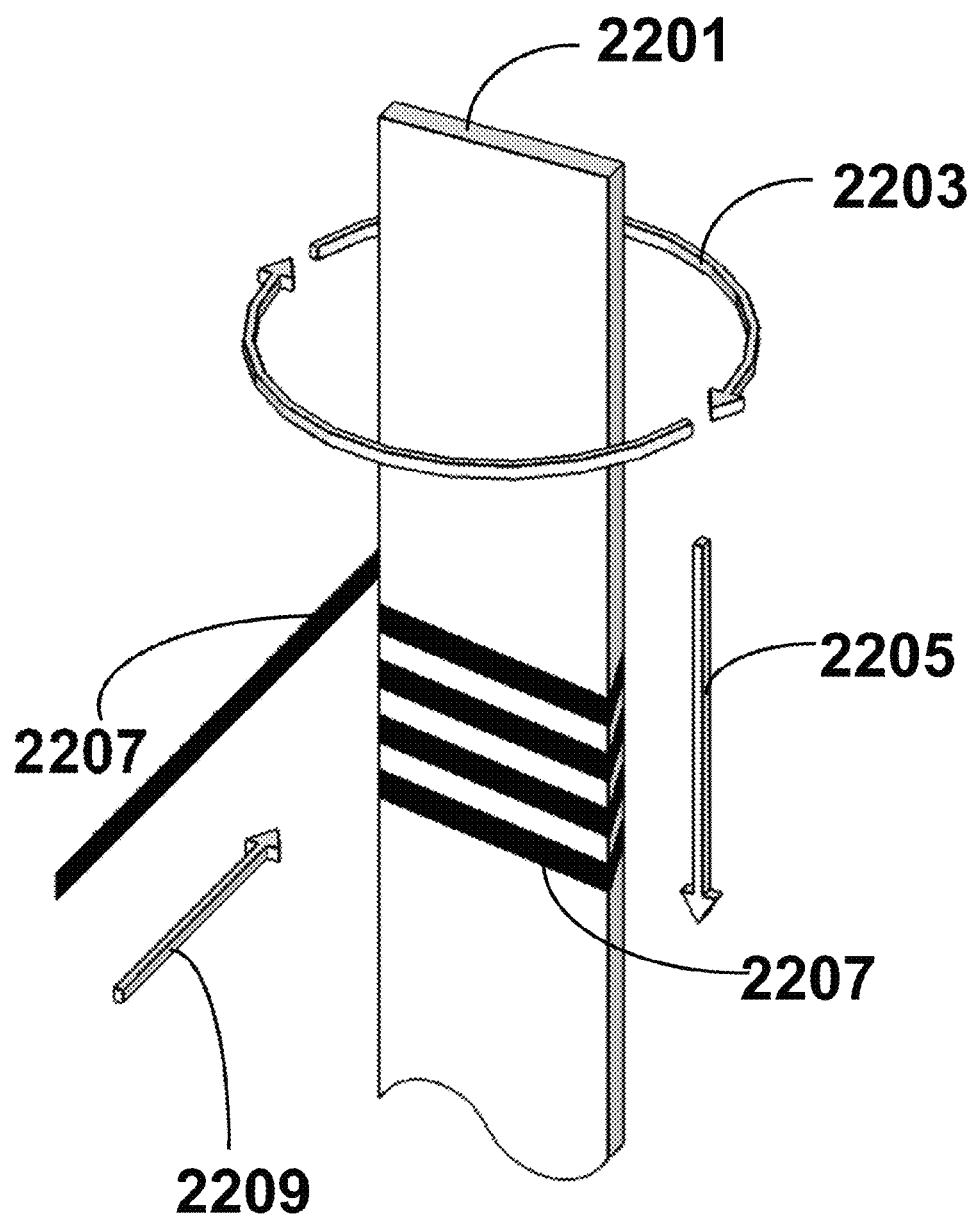
FIG. 22A is a perspective view of wire as it is applied to a diaphragm using progressive axial rotational wire winding.
Figure 22B:
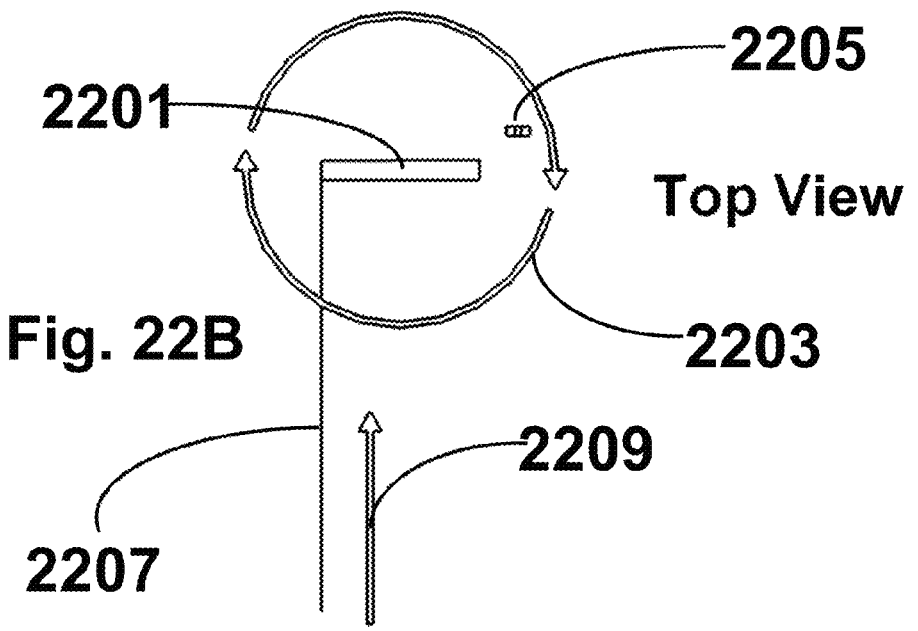
FIGS. 22B and 22C illustrate top and front elevation views, respectively, of applying wire to a diaphragm using progressive axial rotational wire winding.
Figure 22C:
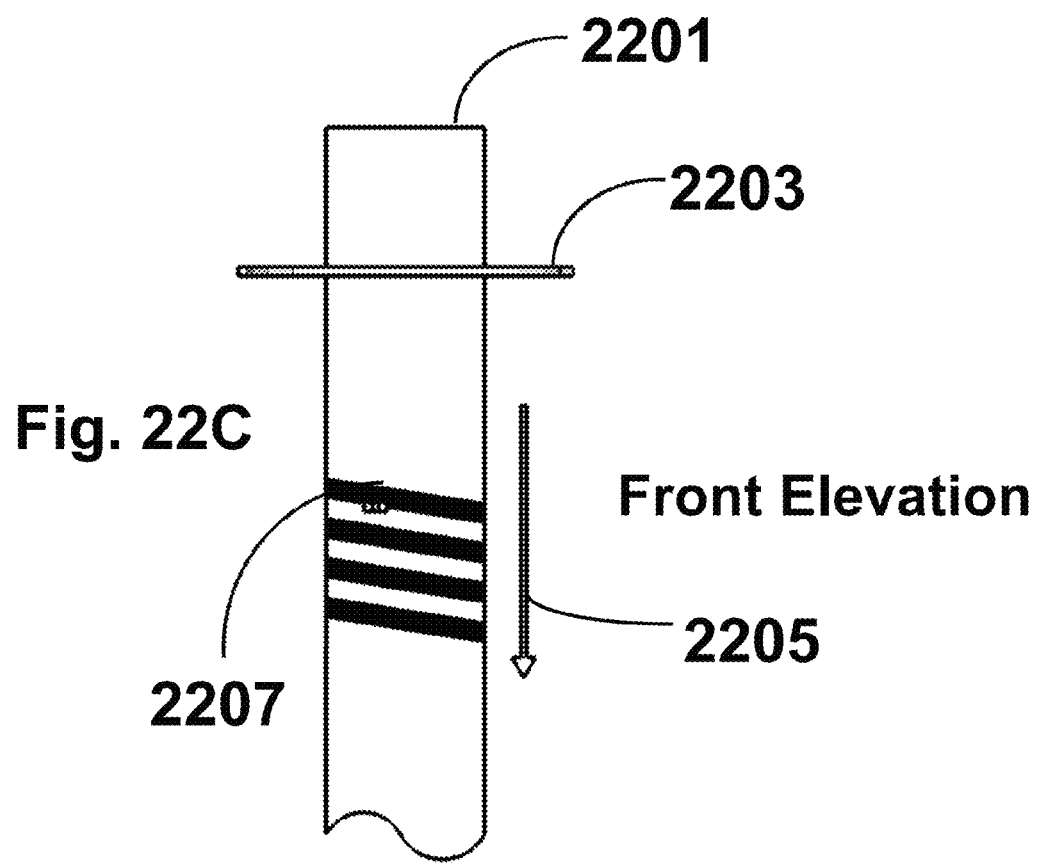
Figure 23A:
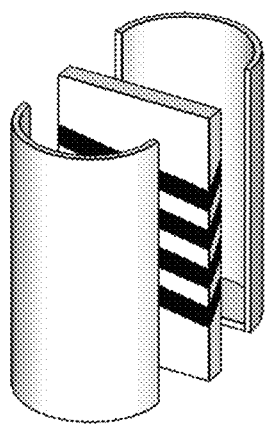
FIGS. 23A and 23B illustrate mid-zone perspective and elevation exploded views, respectively, of a first hemi-enclosure, a second hemi-enclosure, and a diaphragm to which wire has been applied positioned between the hemi-enclosures.
Figure 23B:
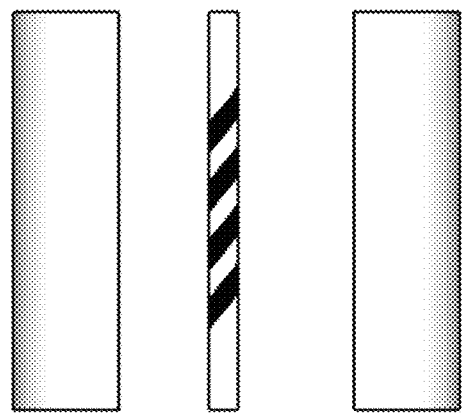
Figure 23C:
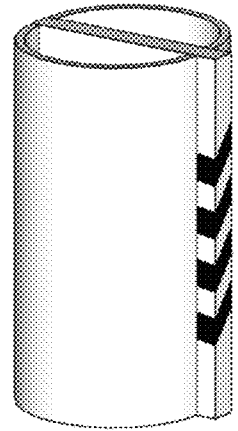
FIGS. 23C and 23D illustrate mid-zone perspective and elevation assembled views, respectively, of a first hemi-enclosure, a second hemi-enclosure, and a diaphragm to which wire has been applied sandwiched between the hemi-enclosures.
Figure 23D:
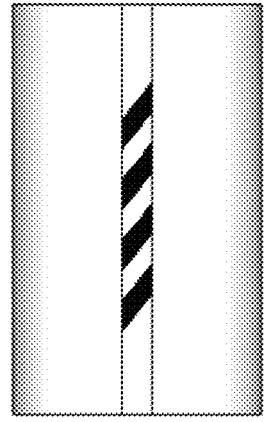
Figure 23E:
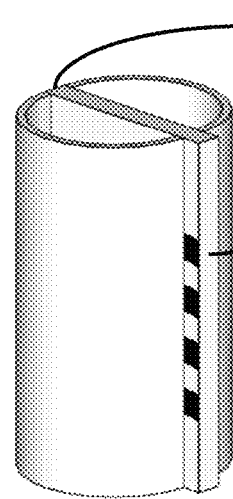
FIGS. 23E and 23F illustrate the views of FIGS. 23C and 23D with the wire trimmed from the edges of the diaphragm.
Figure 23F:
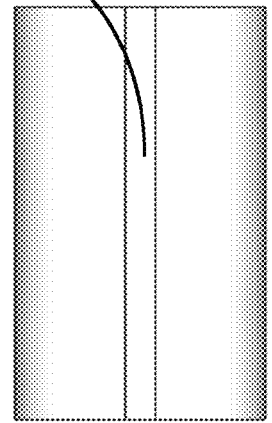

FIG. 22A is a perspective view of wire as it is applied to a diaphragm using progressive axial rotational wire winding. FIGS. 22B and 22C illustrate top and front elevation views, respectively, of applying wire to a diaphragm using progressive axial rotational wire winding. FIGS. 22A, 22B and 22C illustrate a diaphragm 2201 rotating about an axis defined by a rotational arrow pair 2203. An arrow 2205 indicates linear motion of the diaphragm. A wire 2207 is fed in the direction indicated by an arrow 2209 to the diaphragm 2201. Rotational and linear movements are synchronized to accommodate the wire 2207. As diaphragm 2201 is rotated and moved linearly in the direction of the arrow 2205, wire is applied in a first vicinity of a first side of the diaphragm 2201 and in a second vicinity of a second opposed side of the diaphragm 2201.

Preparation of a diaphragm includes selection of the diaphragm material, cutting the diaphragm material to size, and anchoring a wire to the diaphragm. The prepared diaphragm is mounted on a wire-winding machine. The wire-winding machine is not illustrated. Wire winding machines that may be used include those described in *Coil Winding: A Description of Coil Winding Procedures, Winding Machines and Associated Equipment* by William Querfurth (G. Stevens Mfg. Co. Pub. 1954, 128 pages) and *Practical Directions for Winding Magnets for Dynamos* by Carl Hering (BiblioBazaar, reprinted 2008, 76 pages). Both books are incorporated by reference in their entirety. The diaphragm is comprised of a material that passes ions and impedes the passage of gases.

There may be variations of the teachings of FIGS. 22A, 22B and 22C as well as the other figures. For example, the relative linear motion between the wire feed and diaphragm may be achieved by linear vertical motion, for example, of the wire feed as the diaphragm rotates to accommodate the wire. In this variation of the method of FIG. 22 the diaphragm is rotated, but not moved linearly. It is the source of wire that moves linearly as wire is fed to the diaphragm. Another example of applying wire in vicinities of first and second opposed sides of a diaphragm is progressive orbital rotational wire winding.

The method of progressive orbital rotational wire winding is similar to the method of progressive axial rotational wire winding, with the exception that it is the wire feed that orbits around the diaphragm while simultaneously moving linearly with respect to the diaphragm. Other wire application techniques include serpentine wire winding, progressive axial rotational latch wire winding, and independent wire strand placement. Some embodiments of wire-winding use a concentric sleeve around the diaphragm to reinforce and support the diaphragm during the wire-winding process. In some embodiments rotational and linear movements are implemented by automated manufacturing techniques such as robotics, robot vision, machine vision and/or digitally controlled motion devices, systems or positioners.

Following application of wire to the diaphragm, a first hemi-enclosure, the wire, the diaphragm, and a second hemi-enclosure are fastened together and the wire on the edges of the diaphragm is trimmed, as illustrated in FIG. 23. FIGS. 23A and 23B illustrate mid-zone perspective and elevation exploded views, respectively, of a first hemi-enclosure, a second hemi-enclosure, and a diaphragm to which wire has been applied positioned between the hemi-enclosures. FIGS. 23C and 23D illustrate mid-zone perspective and elevation assembled views, respectively, of a first hemi-enclosure, a second hemi-enclosure, and a diaphragm to which wire has been applied sandwiched between the hemi-enclosures. FIGS. 23E and 23F illustrate the views of FIGS. 23C and 23D with the wire trimmed from the edges of the diaphragm, whereby a first plurality of wire electrodes is fastened in a first vicinity of a first side of the diaphragm and a second plurality of wire electrodes is fastened in a second vicinity of a second opposed side of the diaphragm.

The method of progressive axial rotational latch wire winding is a variation of the method of progressive axial rotational wire winding. Since diaphragms are often made of relatively soft materials such as polymers, for example, a variation of the winding method of FIG. 22 includes latching the wire to the diaphragm by using the wire as a cutting tool to notch the diaphragm during the winding process. The notch serves as a local latch or anchor point for the wire which, when integrated into and used to modify the compound rotational and linear motions may be used to establish alternate wire patterns in vicinities of the first side and second opposed sides of the diaphragm.

FIGS. 24A, 24B, 24C and 24D illustrate perspective, top, front elevation and right elevation views, respectively, of applying wire to a diaphragm using serpentine wire winding. FIG. 24 illustrates a diaphragm 2401, a first set of guide posts 2403 and a second set of guide posts 2405 on opposite sides of the diaphragm 2401. The guide posts 2403 and 2405 are structures around which a wire 2407 is wound to form a serpentine pattern on both sides of the diaphragm 2401. For clarity, FIG. 24 illustrates the serpentine pattern on one side of the diaphragm 2401 only. Following completion of the serpentine pattern on both sides of the diaphragm, the diaphragm 2401 and the wires are sandwiched between a first hemi-enclosure and a second hemi-enclosure and fastened with a leak-tight fastener, whereby a leak-tight enclosure is formed. For clarity, the hemi-enclosures and fastener are not illustrated in FIG. 24. Upon cutting the wire on both sides and freeing the leak-tight enclosure from the guide posts 2403 and 2405, a first plurality of electrodes is fastened in a first vicinity of a first side of the diaphragm 2401 and a second plurality of electrodes is fastened in a second vicinity of a second opposed side of the diaphragm 2401 in the enclosure.

Figure 25:
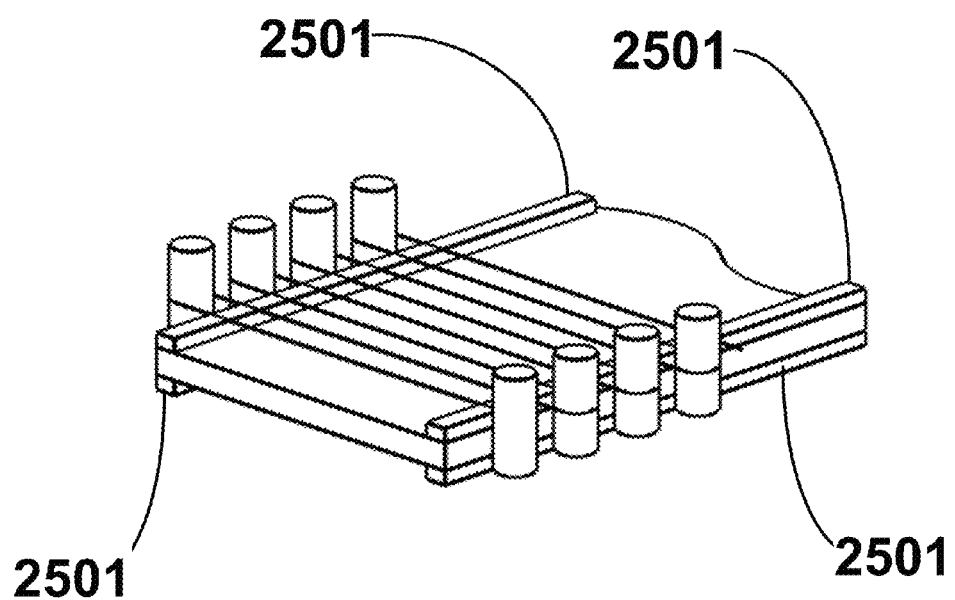
FIG. 25 illustrates the serpentine wire winding shown in FIG. 24 with added spacers.

FIG. 25 illustrates the serpentine wire winding shown in FIG. 24 with added spacers, whereby the wire is located in vicinities that include space between the wire and first side and second opposed side of the diaphragm. Spacers 2501 are strips, for example, that are parallel to first and second opposed sides of the diaphragm. Spacers may be used in conjunction with any wire applying method.

A further embodiment of the method of serpentine wire winding is to omit the wire cutting act and wrap the wire around rotatable collars that are added to the guide posts. The rotatable collars reduce friction so that the wire can be pulled through the electrolysis apparatus without disassembling it to provide fresh electrodes as needed, thereby simplifying maintenance and reducing downtime of the electrolyzer apparatus.

FIGS. 26A and 26B illustrate perspective and top views, respectively, of wire that has been applied using a method of independent wire strand placement. Independent wire strand placement is another method for applying pluralities of wires to opposed sides of a diaphragm. FIG. 26 illustrates perspective and top views of applying wire in a first vicinity of a first side of a diaphragm 2601 and in a second vicinity of a second opposed side of the diaphragm 2601 using the method of independent wire strand placement. A first plurality of independent wire strands 2603 is placed in a first vicinity of a first side of the diaphragm 2601. A second plurality of independent wire strands 2605 is placed in a second vicinity of a second opposed side of the diaphragm 2601. Following the placements of the first plurality of independent wire strands 2603 and the second plurality of independent wire strands 2605, the wires and the diaphragm are sandwiched between and fastened with a leak-tight fastener to first and second hemi-enclosures and subject to wire trimming, whereby a first plurality of wire electrodes is fastened in a first vicinity of a first side of the diaphragm and a second plurality of wire electrodes is fastened in a second vicinity of a second opposed side of the diaphragm in the formed enclosure.

A variation of the FIG. 26 method of independent wire strand placement is to leave the wires of the first plurality of independent wire strands 2603 and the second plurality of independent wire strands 2605 untrimmed and mount the wires on feed bobbins and take-up bobbins. This embodiment provides mobility to the wire electrodes whereby wire can be pulled to the take-up bobbins and into the electrolyzer to provide fresh electrodes as needed without disassembly of the electrolyzer apparatus. This embodiment simplifies operation, maintenance and reduces downtime of the apparatus.

In some embodiments the electrodes are at a predetermined distance from the diaphragm. The predetermined distance is precisely, about, less than, or up to, for example, 0.0, 0.01, 0.02, 0.03, 0.04, 0.05, 0.06, 0.07, 0.08, 0.09, 0.1, 0.5, 1.0, 5, 10, 50, 100, 500 millimeters or a distance within a range bounded by any two of the foregoing values. Electrodes that physically touch the diaphragm can be applied by one or more known deposition techniques such as sputter, chemical vapor, physical vapor, evaporation, electrolytic, inking, electroless, and atomic layer deposition techniques. The *Handbook of Physical Vapor Deposition Processing*, Second Edition by Donald M. Mattox (May 19, 2010) discloses approaches that may be used and is incorporated by reference in its entirety.

Electrodes of a predetermined size are used for some embodiments of the disclosed diaphragm electrode array. The longest dimension of a single electrode is governed by the cross-sectional size of the assembled apparatus. For example, if the cross-section of assembled structure FIG. 1B is approximately a circle, the length of each electrode would be about the size of the diameter of the circle, plus protrusions, if any. The predetermined length of each electrode is precisely, about, less than, or up to, for example, 0.1, 1, 2, 3, 4, 5, 6, 7, 8, 9, 10, 20, 30, 40, 50, 60, 70, 80, 90, 100, 500, 1000 centimeters or a length within a range bounded by any two of the foregoing values. The electrodes contain no insulating coating.

The cross-section of a single electrode is the geometric shape whose plane is perpendicular to the length direction of the electrode. For example, if the cross-section of the electrode is a circle, the longest linear dimension of the cross-section is the diameter of the circle. A predetermined size of the longest linear dimension of the electrode cross-section is used for some embodiments of the diaphragm electrode array. The predetermined size of the longest linear dimension of the electrode cross section is precisely, about, less than, or up to, for example 0.01, 0.05, 0.1, 0.2, 0.3, 0.4, 0.5, 0.6, 0.7, 0.8, 0.9, 1, 2, 3, 4, 5, 10, 100, 1000 millimeters or a dimension within a range bounded by any two of the foregoing values. The word "size" when used to describe the dimensions of an electrode includes the length dimension and/or the longest linear dimension of the cross-section of the electrode.

A predetermined intra plurality spacing is used for some embodiments of the electrodes of the first plurality of electrodes in a first vicinity of the first side of the diaphragm. A predetermined intra plurality spacing is used for some embodiments of the electrodes of the second plurality of electrodes in a second vicinity of the second opposed side of the diaphragm. The predetermined spacing between intra plurality adjacent electrodes is precisely, about, less than, or up to, for example, 0.1, 0.2, 0.3, 0.4, 0.5, 0.6, 0.7, 0.8, 0.9, 1, 2, 3, 4, 5, 6, 7, 8, 9, 10, 20, 30, 40, 50, 100 millimeters or a dimension within a range bounded by any two of the foregoing values.

A predetermined number of electrodes is used for some embodiments of each electrolyzer apparatus. The predetermined number of electrodes is precisely, about, greater than, or no less than, for example, 4, 6, 8, 10, 30, 50, 100, 150, 200, 300, 400, 500, 600, 700, 800, 900, 1000, 2000, 3000, 4000, 5000, 6000, 7000, 8000, 9000, 10000, 50,000, 100,000, or a number within a range bounded by any two of the foregoing values.

A predetermined average value of electric current per anode electrode and per cathode electrode is used for some embodiments. The average electric current per cathode electrode means the total current flowing between the cathode plurality and the anode plurality divided by the number of cathode electrodes. An analogous definition applies to the average current per anode electrode. The predetermined average value of electric current per cathode electrode and/or per anode electrode is precisely, about, less than, or up to, for example, 0.001, 0.01. 0.05, 0.1, 0.2, 0.3, 0.4, 0.5, 0.6, 0.7, 0.8, 0.9, 1, 2, 3, 4, 5, 6, 7, 8, 9, 10, 50, 100, 500, 1000, 5000 milliamperes or a current within a range bounded by any two of the foregoing values. In some embodiments none, some, or all of the foregoing predetermined values are included.

Selection of specific values among the foregoing embodiments of (i) predetermined size per electrode, (ii) predetermined intra plurality spacing between adjacent electrodes, (iii) predetermined number of electrodes per electrolyzer apparatus; (iv) predetermined average value of electric current per anode electrode and/or per cathode electrode, and; (v) predetermined distance of the electrodes from the diaphragm depends on the utilitarian objectives the user of the disclosed apparatus and method. For example, if the user's objective is a hydrogen and oxygen production electrolysis system that minimizes electrode corrosion, system maintenance, construction cost, height of the apparatus, maximizes electrical conversion efficiency and operational lifetime and is constructed on relatively less expensive land, then selection among the foregoing predetermined values favors lower current densities, electrodes that are close to the diaphragm and electrolyzers with shorter height. On the other hand, if the production system is constructed on relatively expensive land, as in urban areas, where maximum production per unit land area is a factor, then higher current densities, taller electrolyzers, increased spacing between the electrodes and diaphragm and more electrodes per electrolyzer are favored.

The disclosed embodiments may provide advantages relative to previous electrolyzers. One advantage may be slowing the rate of corrosion of electrodes. The advantage may be based on the inherent pathways of electron flow in the electrodes and the mechanisms of corrosion and flow of electrons in electronic materials. See for example, *Fundamentals of Electrochemical Corrosion* by E. E. Stansbury and R. A. Buchanan, (ASM International, Materials Park, Ohio), the article "Grain Boundaries and Electronic Materials" by B. Glowacki, M. Vickers and E. Maher, (Azo Materials, Sydney, Australia) and the article by J. Kruger, "Electrochemistry of Corrosion" in the Electrochemistry Encyclopedia (Case Western Reserve University, Cleveland, Ohio) all of which are incorporated by reference in their entirety. The presence of grain boundaries in electronic materials may obstruct and divert the flow of electric current causing localized heating. Other conducting pathways may become more highly stressed, as they have to carry more current. This can give rise to 'thermal runaway' effects and corrosion. The problem is pertinent to large metal plate high-current electrodes. A plurality of electrodes may reduce the severity of the problem by restricting the flow of electric current in wire, for example, to substantially the direction of the wire thereby limiting the options for obstruction, diversion and localized heating. The practical utility of the disclosed embodiments is that for a given current and mass of electrode material, the same amount of hydrogen and oxygen can be produced at lower electric current densities by a plurality of pairs electrodes as compared to a single electrode pair of the same mass, thereby slowing the rate of corrosion of the electrodes, reducing over potential, and increasing electrical energy conversion efficiency to hydrogen energy.

The disclosed embodiments may address the problem delineated in the Background section with respect to practical large-scale implementation of hydrogen and oxygen production via the utilization of electrolysis apparatuses. Specifically, the embodiments may simplify structural design, implement modern automation technology, and minimize the amount of metal needed for fabrication. In addition, the modular nature of the disclosed embodiments may more easily lend themself to large-scale integrated system scale-up.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. An apparatus for the electrolytic splitting of water into hydrogen and oxygen gases, the apparatus comprising:
   a first hemi-enclosure;
   a second hemi-enclosure that is separable from and not integral with the first hemi-enclosure;
   a diaphragm electrode array positioned between the first hemi-enclosure and the second hemi-enclosure comprising:
      a diaphragm, that passes ions and impedes the passage of gases, comprising a first side and a second opposed side;
      a first plurality of electrodes in the vicinity of the first side of the diaphragm;
      a second plurality of electrodes in the vicinity of the second opposed side of the diaphragm;
   a fastener, for leak-tight fastening of the first hemi-enclosure, the diaphragm electrode array, and the second hemi-enclosure, whereby a leak-tight enclosure is formed;
   contacts, for electrically contacting the first and second pluralities of electrodes; and
   pathways, configured to separately remove hydrogen and oxygen gases from the enclosure, the pathways including:
      a first headspace comprising a barrier associated with the first hemi-enclosure that is impermeable to ions, gases, and water;
      a first pipe communicatively-coupled to the first headspace that receives gas generated within the first headspace and routes that received gas:
         outside of the first hemi-enclosure and the first headspace;
         then back inside of the first hemi-enclosure;
         then through a substantial portion of fluid contained within the first hemi-enclosure; and
         then back outside of the first hemi-enclosure through a bottom portion of the first hemi-enclosure;
      a second headspace comprising a barrier associated with the second hemi-enclosure that is impermeable to ions, gases, and water;
      a second pipe communicatively-coupled to the second headspace that receives gas generated within the second headspace and routes that received gas:
         outside of the second hemi-enclosure and the second headspace;
         then back inside of the second hemi-enclosure;
         then through a substantial portion of fluid contained within the second hemi-enclosure; and
         then back outside of the second hemi-enclosure through a bottom portion of the second hemi-enclosure.

2. The apparatus of claim 1, further comprising a source of electrical power for powering the apparatus.

3. The apparatus of claim 1 wherein the hemi-enclosures are comprised of discrete zone components within each hemi-enclosure.

4. The apparatus of claim 1 wherein each headspace includes a baffle comprised of a hydrophilic surface.

5. The apparatus of claim 1 further comprising heat sinks configured to exchange heat between the water and ambient environment using the electrolytically produced gases flowing in the pipes that exit the apparatus through bottom portions of the hemi-enclosures.

6. The apparatus of claim 1 wherein the contacts comprise busbars, shim stock, sheet metal, edge connectors containing a plurality of sockets that connect with the plurality of external wire contacts, or strip connectors, or any combination thereof.

7. The apparatus of claim 1 wherein each electrode includes a catalyst.

8. An electrolysis apparatus for splitting water into hydrogen and oxygen gases using electrolysis, the electrolysis apparatus comprising:
   a first hemi-enclosure;
   a second hemi-enclosure that is separable from and not integral with the first hemi-enclosure;
   a diaphragm electrode array positioned between the first hemi-enclosure and the second hemi-enclosure comprising:
      a diaphragm, that passes ions and impedes the passage of gases, comprising a first side and a second opposed side;
      a first plurality of wire electrodes in the vicinity of the first side of the diaphragm, wherein the wires emerge from the apparatus in a first interface defined by abutting edges of the first hemi-enclosure and the first side of the diaphragm to form a first plurality of electrical wire contacts that are external to the apparatus;
      a second plurality of wire electrodes in the vicinity of the second opposed side of the diaphragm, wherein the wires emerge from the apparatus in a second interface defined by abutting edges of the second hemi-enclosure and the second side of the diaphragm to form a second plurality of electrical wire contacts that are external to the apparatus;
   a fastener that fastens the first hemi-enclosure, the diaphragm electrode array and the second hemi-enclosure together so as to form a leak-tight enclosure;
   a first pipe configured to remove the hydrogen gas from the enclosure, but not the oxygen gas; and
   a second pipe configured to remove the oxygen gas from the enclosure, but not the hydrogen gas.

9. The apparatus of claim 8 wherein the external wires are trimmed.

10. The apparatus of claim 8 further comprising:
    a first headspace comprising a barrier associated with the first hemi-enclosure that is impermeable to ions, gases, and water;
    wherein the first pipe is communicatively-coupled to the first headspace that receives the hydrogen gas generated within the first headspace and routes that received gas:
       outside of the first hemi-enclosure;
       then back inside of the first hemi-enclosure;

then through a substantial portion of fluid contained within the first hemi-enclosure; and then again outside of the first hemi-enclosure through a bottom portion of the first hemi-enclosure; and a second headspace comprising a barrier associated with the second hemi-enclosure that is impermeable to ions, gases, and water;

wherein the second pipe is communicatively-coupled to the second headspace that receives the oxygen gas generated within the second headspace and routes that received gas:

outside of the second hemi-enclosure;

then back inside of the second hemi-enclosure;

then through a substantial portion of fluid contained within the second hemi-enclosure; and then again outside of the second hemi-enclosure through a bottom portion of the second hemi-enclosure.

11. The apparatus of claim 2 wherein the source of electrical power is comprised of substantially one power supply.

12. The apparatus of claim 10 wherein the first plurality of wire electrodes is anchored by opposing edges of the first hemi-enclosure and the first side of the diaphragm and the second plurality of wire electrodes is anchored by opposing edges of the second hemi-enclosure and the second side of the diaphragm.

* * * * *